(12) United States Patent
Royston

(10) Patent No.: US 12,212,126 B2
(45) Date of Patent: Jan. 28, 2025

(54) IGNITION SUPPRESSION CIRCUITING TECHNOLOGY

(71) Applicant: ISCT LLC, Madisonville, LA (US)

(72) Inventor: Clifton Royston, Metairie, LA (US)

(73) Assignee: ISCT LLC, Madisonville, LA (US)

( * ) Notice: Subject to any disclaimer, the term of this patent is extended or adjusted under 35 U.S.C. 154(b) by 0 days.

(21) Appl. No.: 18/752,330

(22) Filed: Jun. 24, 2024

(65) Prior Publication Data

US 2024/0348022 A1 Oct. 17, 2024

Related U.S. Application Data

(63) Continuation of application No. 18/538,144, filed on Dec. 13, 2023, now Pat. No. 12,113,340, which is a continuation of application No. 18/347,545, filed on Jul. 5, 2023, now Pat. No. 11,855,425, which is a continuation of application No. 17/713,007, filed on Apr. 4, 2022, now Pat. No. 11,728,633, which is a continuation of application No. 16/834,819, filed on Mar. 30, 2020, now Pat. No. 11,295,874, which is a continuation-in-part of application No. 16/230,813, filed on Dec. 21, 2018, now Pat. No. 10,607,751,
(Continued)

(51) Int. Cl.
| | |
|---|---|
| *H02G 3/04* | (2006.01) |
| *H01B 7/04* | (2006.01) |
| *H01B 7/18* | (2006.01) |
| *H01B 7/295* | (2006.01) |
| *H01B 7/42* | (2006.01) |

(52) U.S. Cl.
CPC ............ *H02G 3/0412* (2013.01); *H01B 7/04* (2013.01); *H01B 7/18* (2013.01); *H01B 7/295* (2013.01); *H01B 7/421* (2013.01)

(58) Field of Classification Search
None
See application file for complete search history.

(56) References Cited

U.S. PATENT DOCUMENTS

| | | | |
|---|---|---|---|
| 729,935 A | 6/1903 | Maccormac | |
| 2,382,120 A * | 8/1945 | White ................... | H01B 7/295 169/57 |

(Continued)

FOREIGN PATENT DOCUMENTS

| | | |
|---|---|---|
| CN | 109475766 | 10/2021 |
| EP | 3463593 A1 | 4/2019 |

(Continued)

OTHER PUBLICATIONS

International Search Report and Written Opinion, International Application No. PCT/US2016/018978, mailed Aug. 11, 2016.

*Primary Examiner* — Krystal Robinson
(74) *Attorney, Agent, or Firm* — MARSHALL, GERSTEIN & BORUN LLP

(57) ABSTRACT

A cable system is provided which is configured with both electric wires and a fluid conduit running through the axial passage of a surrounding flexible sheath of the cable. The system allows for communication of electricity over the wires for electrical circuits and concurrent communication of a fire ignition suppressant fluid or gas through the fluid conduit, to all points in an electric circuit using the cable. One or both of a dye or scent can be included in the ignition suppressant fluid.

18 Claims, 20 Drawing Sheets

Related U.S. Application Data which is a continuation-in-part of application No. 14/913,959, filed as application No. PCT/US2016/018978 on Feb. 22, 2016, now Pat. No. 10,170,218.

(60) Provisional application No. 62/119,004, filed on Feb. 20, 2015.

(56) References Cited

U.S. PATENT DOCUMENTS

| | | | |
|---|---|---|---|
| 3,170,026 A | | 2/1965 | Woodson |
| 3,179,181 A | | 4/1965 | Banzato |
| 3,551,581 A | | 12/1970 | Goodman |
| 3,652,797 A | * | 3/1972 | Goodman .............. H01B 9/001 219/137.9 |
| 3,801,724 A | * | 4/1974 | Goodman .............. H01B 9/001 439/190 |
| 3,865,967 A | | 2/1975 | Pritchett |
| 4,836,290 A | | 6/1989 | Le Lande, Jr. |
| 5,269,377 A | * | 12/1993 | Martin .................. E21B 17/206 166/385 |
| 6,095,252 A | * | 8/2000 | Draugelates ............. A62C 3/16 169/58 |
| 6,167,178 A | * | 12/2000 | Nave .................... G02B 6/4436 385/103 |
| 6,655,302 B1 | | 12/2003 | Ross |
| 7,004,677 B1 | | 2/2006 | Ericksen et al. |
| 8,193,450 B1 | * | 6/2012 | Kam .................... H02G 3/0456 174/16.3 |
| 9,321,362 B2 | | 4/2016 | Woo et al. |
| 9,701,210 B2 | | 7/2017 | Woo et al. |
| 10,170,218 B2 | * | 1/2019 | Royston ................ H01B 7/295 |
| 11,865,386 B2 | | 1/2024 | Malovec |
| 2003/0094297 A1 | * | 5/2003 | Morrow .................. H02G 3/06 174/505 |
| 2004/0231724 A1 | | 11/2004 | Mahaney |
| 2006/0249298 A1 | * | 11/2006 | Reece .................. H01B 13/145 174/110 R |
| 2007/0179062 A1 | * | 8/2007 | Hirose .................. H01B 12/16 174/15.5 |
| 2010/0025053 A1 | | 2/2010 | Chesley |
| 2010/0132964 A1 | | 6/2010 | Whitney |
| 2014/0221213 A1 | * | 8/2014 | Fukuda ................. H01B 12/16 174/15.5 |
| 2016/0200206 A1 | * | 7/2016 | Woo ........................ B60L 53/11 320/109 |

FOREIGN PATENT DOCUMENTS

| | | |
|---|---|---|
| RU | 99894 U1 | 11/2010 |
| SK | 7684 Y1 | 2/2017 |
| SK | 7760 Y1 | 5/2017 |
| WO | WO-2005/104143 A1 | 11/2005 |
| WO | WO-2017/208166 A1 | 12/2017 |

\* cited by examiner

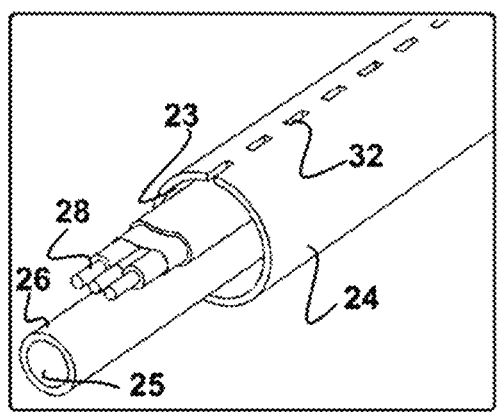
FIG. 25
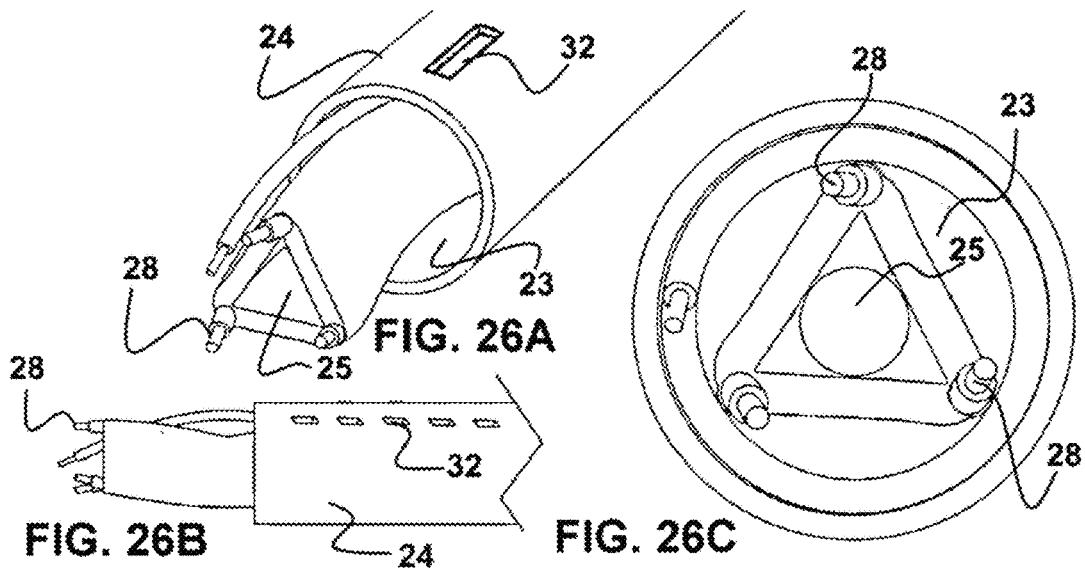
FIG. 26A
FIG. 26B
FIG. 26C
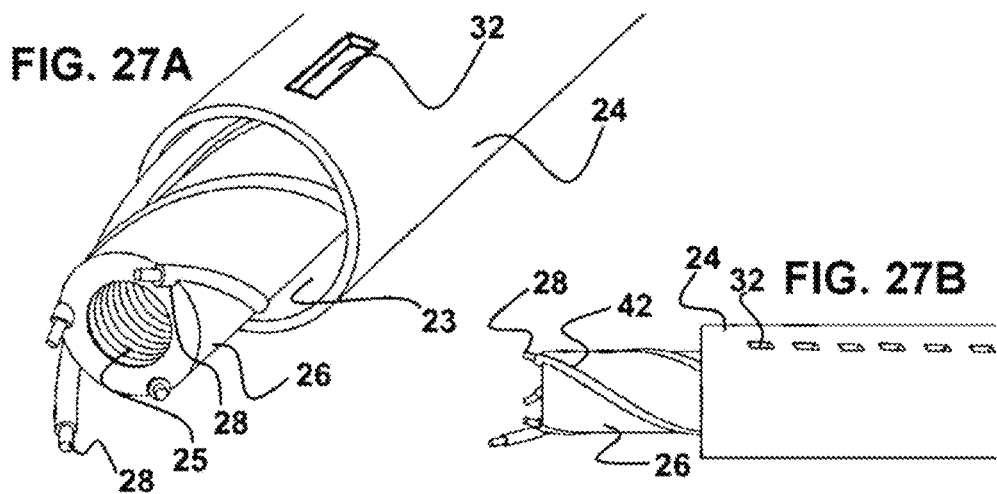
FIG. 27A
FIG. 27B

IGNITION SUPPRESSION CIRCUITING TECHNOLOGY

CROSS-REFERENCE TO RELATED APPLICATIONS

This application is a Continuation of U.S. patent application Ser. No. 18/538,144, filed on Dec. 13, 2023, which is a Continuation of U.S. patent application Ser. No. 18/347,545, filed on Jul. 5, 2023, which is a Continuation of U.S. patent application Ser. No. 17/713,007, filed on Apr. 4, 2022, which is a Continuation in Part of U.S. patent application Ser. No. 16/834,819, filed on Mar. 30, 2020, which is a Continuation in Part of U.S. patent application Ser. No. 16/230,813, filed on Dec. 21, 2018, which is a Continuation in Part of U.S. patent application Ser. No. 14/913,959, filed on Feb. 23, 2016, which is a U.S. National Stage Entry of International Application No. PCT/US16/18978, filed on Feb. 22, 2016, which claims priority to U.S. Provisional Patent Application No. 62/119,004, filed on Feb. 20, 2015, all of which are respectively included herein in their entirety by this reference thereto.

FIELD OF THE INVENTION

The present device relates to electric systems using cable which is employed throughout the world for communication of electric wires from a buss to individual outlets and connections, as well as communications and other cabling systems. More particularly, the disclosed device and method relate to a cabling system including both electrical and/or communications wiring in concert with an adjacent fluid conduit employable for communication of a fire ignition suppressant fluid or gas such as Halon or a clean agent or inert gas, through the entire cabling system between a main panel and junction boxes and electrical connection points along the conduit system.

BACKGROUND OF THE INVENTION

Electricity delivery systems in buildings in the U.S. and most of the world have evolved for safety and servicing reasons to employ metal or polymeric conduits, which provide a pathway therethrough for electrical wiring. Such wiring is employed for carrying current from a buss to individual sockets and connectors for equipment requiring electrical power and in other configurations for communications cables running between points. Running the electric and other wiring through a system of conduits protects it from wear over years of use and additionally provides access to retrofit or run new wiring subsequent to the completion of the walls of a structure which will encase the wiring therein. Such conduit in some instances is employed for shielding the contained wiring from EMF which can be generated by wires carrying electricity and electrical signals.

Electricity is conventionally run in individual circuits from a connection to the grid, through a circuit breaker connected to a central buss or other main connection. From the circuit breaker connection to the central buss, the electric wiring extends in a circuit to one or a plurality of remote connectors to which equipment requiring electricity engages. Such circuits may include junction boxes and other connectors downstream. By junction boxes is meant any box or mounting component adapted for joining wires or engaging sockets or distributing electric power or lighting or any electrical box used for any such purpose.

The connection to components using electricity conventionally engages the appliance or device requiring electrical power, to the circuit, using sockets and junction boxes and switches which can also connect with light fixtures and other components of conventional electric systems. For safety reasons, each individual electrical circuit is conventionally wired to carry electricity at a particular amperage load that the equipment or devices anticipated to connect to the circuit will require during use. This is generally accomplished by increasing or decreasing the diameter or size of the wires running through the electrical conduits for larger or smaller current requirements for the equipment connecting to the respective circuit. This wire size requirement is also adjusted by the distance the circuit will travel from the connection to a circuit breaker at the main buss or junction box.

A circuit breaker or fuse conventionally connects each circuit to the buss which is engaged to the power grid. The circuit breaker is generally sized to trip or open, to open the circuit should the amperage load, being drawn by equipment connected to points along the circuit, exceed the designed electrical load of the wiring for the circuit. Thus, the circuit breaker supplying a circuit will have a maximum amperage rating that will cause the circuit breaker to open should the electric load being drawn by equipment engaged to that circuit exceed the amperage rating of the circuit breaker.

This safeguard, designed into electric systems, is an important factor in preventing circuit overload and resulting fires which such can cause. In many instances an electrical fire caused by a circuit drawing excess electric current can be catastrophic such as in a high rise building, a hospital, or on a ship far from port where a fire can threaten the lives of all aboard.

However, even the best designed electrical system is not a total safeguard from an electrical fire caused by circuit overload, resistive heating at junctions or sockets, loose connectors, sparking, over voltage, or damaged electric lines and the like. For example, loose connections at a socket or wire connection in a junction box, will not cause an overload of current which will trip a circuit breaker. However, loose connections, along with over voltage situations, can generate resistive heating and in some cases sparking, which can easily ignite adjacent flammable materials in walls and ceilings and the like.

Further, over time, by accident or design, circuit breakers can be replaced with replacement breakers having amperage ratings exceeding the circuit they supply. Such can easily occur during maintenance when a circuit breaker is replaced with one of higher amperage due to the installed circuit breaker constantly tripping. While electricians would not make such a replacement, untrained personnel, owners and tenants, are well known for implementing such a fix.

Installing circuit breakers which have current ratings which exceed that anticipated in the circuit, can easily result in resistive heating of wiring along the circuit in places hidden from discovery such as in within conduits or junction boxes. This is caused by the circuit feeding electricity to more equipment on the circuit with a sum amperage being used which exceeds that for which the circuit was designed.

Further, loose connections along the circuit which cause resistive heating to occur during normal operation with the correct breaker engaged in the circuit, will emit heat which is significantly increased should the circuit draw more current than the maximum design. Such resistive heating and even sparking frequently occurs injunction boxes where multiple wires are engaged by wire nuts, terminal blocks, or in boxes housing electrical sockets and the like.

Additionally, connectors such as sockets and switches can over time become damaged or loose from the wire supplying them, or engaged in a manner which causes heating within the conduits and junction boxes. Again such occurs out of sight by users and inspectors, but adjacent flammable wood or plastic or insulation materials in walls and floors which become pyrolyzed from continuous or instantaneous overheating will have a reduced ignition temperature.

Such overheating of wiring in a junction box, or wall box holding an electrical socket or switch can thus easily become an ignition source and the cause of a fire. This is especially dangerous, since with the heat generated by loose connections or wires running electricity exceeding the wire capacity, continues for the duration of the ongoing communication of electrical current to the circuit. Thus, not only does the wiring become hot enough to ignite the insulation covering the wires, or the walls, ceilings, floors, and other adjacent flammable materials, this heat continues as long as the circuit is powered, and even after a fire has erupted in most cases leading to faster fire spread.

Of course, such an ignition source and resulting fire is hidden and extremely hard to initially detect and just as hard to extinguish once discerned. Thus, the risk of fire ignition and passage through interior wall cavities from overheated electric circuits and the like, is not readily apparent to a layman, but is well known to those in the business of electrical fire safety.

Often, as employees and firefighters do not have access to such relatively small spaces in order to view and discern flames, and to extinguish the flames, as typical water suppression systems are not supposed to be applied to electrically generated fires as that can pose additional fire safety risk for first responders or inhabitants trapped by the fire and the resultant fire spreads. Consequently, these fires can spread easily and quickly, even through structures constructed of fire-resistant material. Such a fire can ignite in the cable or wiring itself in a wall or ceiling if it becomes overheated or has been damaged by abrasion, rodents, lighting, or by other means where it can be exposed or slightly cut. Such fires can ignite in a junction box of a socket or where multiple conduits connect in a wall, to become a raging inferno and spread quickly from the ignition source by traveling through interior spaces of the ceiling or walls.

Still further, in these modern and uncertain times, fires in wiring between circuit breakers and junction boxes can be ignited by an electromagnetic pulse caused by nuclear detonation of either a conventional or what is known as a "dirty" bomb. Such an electromagnetic pulse occurred in Hawaii, decades past when testing by the military detonated over the Pacific Ocean, and could easily occur again in this uncertain world. One such occasion, the copper conductors of all conventional cable wiring systems can instantly overheat which could/would lead to insulation degradation and fire. Such for example can occur as a result of directed energy weapons.

While such potential from overheated circuits of all kinds is dangerous in homes, the risk of harm and loss of life is significantly higher in commercial establishments, high rises, and especially in airplanes, space ships, container ships or cruise ships, since a fire on the open sea in such metal ships spreads quickly and can cause massive loss of life.

Accordingly, the ability to confine an electrically ignited fire to a single room or area, may depend upon the ability to preclude its travel through walls and electrical fixtures, or to accelerate to a larger fire subsequent to ignition. Although previously described conduit systems and fire-proof and fire-resistant junction boxes are formed of materials meant to resist the flames, conventional conduit style electric wiring systems provide no means to extinguish a fire, once ignited in the circuit or in wall or ceiling or other space adjacent thereto, or in a junction box where such cables engage other cables or sockets for appliances. While the noted, use of conduit for communication of electrical wiring through buildings and ships and aircraft provides a pathway to contain the wiring, the heat and smoke generated therein easily escapes to the surrounding area and initiates fires.

However, conventional wiring and infrastructure systems provide no concurrent and jointly communicating pathway for the communication and activation of fire suppression chambers, and suppression devices and components. Instead, such fire suppression materials must be brought to the source of an electrical fire from a remote position such as a fire extinguisher. Such takes time by the time a wall-hidden or conduit-hidden fire is ongoing but first detected. This time wasted, in seeking out a fire suppressant supply and communicating it to the exact location of the previously hidden electrical fire, gives that fire time to spread even further or significantly intensify due to continued electrical heating, where the resulting flames travel through walls and conduits of the structure.

As such there is an unmet need for a cabling system and method configured to route both wiring of electrical circuits in parallel adjacent pathways and through junction boxes and the like, which concurrently allows for positioning of a fire suppression chamber and supply system proximate to any potential fire generated in a conduit or wall or structure. Such a cabling device and method, in addition to providing suppression at or proximate to the point of any hidden or viewable electrical fire, should allow for concurrent positioning for a fire suppression pathway and suppression chambers along and adjacent each circuit of electrical wiring. Such a system should also provide site specific fire suppression components positionable in junction and access areas and adjacent electric wires in the conduit system, which will automatically deliver fire suppressant to an overheated circuit. Such a cabling system when employed for fire suppression should also, once activated at a position along the conduit system for electrical wiring, provides a means for cutting electrical power to the individual circuit which has overheated and for signaling and alerting employees and emergency personnel of an overheated circuit or fire caused by one, even where that fire is not yet viewable.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

OBJECTS OF THE INVENTION

It is an object of the present invention to provide a cabling system and method, which includes a concurrent installation of both electric circuits and a fluid conduit and suppression chambers, adapted for supply by centrally supplied fire suppressant circuits, which are communicable in concert with the electrical wiring pathway from a circuit breaker buss to and through each junction box and housing along the path of each electrical circuit.

It is an additional object of the system herein to provide for suppressant-delivering components such as suppression chambers which are engageable with the fluid tubing along a fire suppressant pathway running adjacent or coaxial with the electrical conduit, which will self-activate to communicate fire suppressant to a circuit which has overheated due to resistive heating automatically.

It is an additional object of the cabling system and method herein to provide means to alert the user of a fire or resistive heating or sparking in an electric circuit, even where hidden by walls or conduits, along with the concurrent automatic release of fire retardant to the source of the resistive heating or sparking.

It is yet another object of the present invention to provide a cable having a fluid conduit and wires which is thereby configured for concurrent routing of electrical wires and a fluid pathway for fluid delivery such as a flame retardant material.

It is yet a further object of this invention to provide such a cable system which is configured to extinguish fires from sparking and resistive heating and the like in any electric circuit between junctions, as well as sense activation of such a fire suppression and concurrently cut electrical power to that circuit.

These and other objects, features, and advantages of the present invention, as well as the advantages thereof, over existing prior art, which will become apparent from the description to follow, are accomplished by the improvements described in this specification and hereinafter described in the following detailed description which fully discloses the invention, but should not be considered as placing limitations thereon.

SUMMARY OF THE INVENTION

In accordance with the purposes of the present invention, as embodied and broadly described herein, the present invention provides a system and method which includes a cabling system enabling the adjacent concurrent routing and proximal positioning, of both wires carrying electricity and a fluid conduit or tube. The tube or conduit for fluid flow, can be configured to automatically dispensed fire suppressant, within the conduits, junction boxes, and other components of an electric wiring system for communicating electrical power. The tubing or conduit providing fire suppressant circuits of the cabling system are configured to run along the same pathways through a structure as the wires and electrical junctions of an enclosed electrical system circuit. Employing the cabling and connectable components herein, both the electric wiring and fire suppressant system may be installed concurrently during construction of the structure or vehicle, where the electric system is installed.

The system herein provides an electric cable surrounded by a sheath or cover which also includes a tubing or conduit pathway for communication of fluid or gas along the electric pathway of the cable. The cabling may be thus employed in one mode for delivery of a pressurized fire suppressant supply, which runs within or in combination with and parallel to the electric wiring in an electric conduit pathway for wiring. Some of the further components employable with the cabling system herein for fire suppression, include for example, suppressant chambers, junction box-housed fire suppressant dispensers, which are proximate to the positioning of electric wires joined in a circuit or which communicate in connections to sockets or connectors in a junction box which in turn connect to electricity-consuming devices.

The system includes retardant dispensing components adapted for engagement to the fluid conduit of the cabling, which are configured for operative positioning in engagements within or to junction boxes, sub-panels, and socket or connection boxes, light fixture mounts, and the like. The dispensing components are configured to engage electric sockets and connectors as well as junctions between wires which enter or exit therefrom. The fluid conduit itself is formed of a material adapted to melt at a temperature indicative of a fire or overload from resistive heating and dispense suppressant at locations in between the circuit buss disconnect assemblies, and junction boxes.

Connections between fluid conduit or tubing and dispensing components in one preferred mode of the system, employ circular junction points although alternative configurations can optionally include specific terminal male or female connectors for easy disassembly and access. The junction boxes having retardant dispensing components operatively mounted therein or thereto, may also include sub panel breakers and busses, and/or sockets engageable with appliances or lighting or other devices consuming electric power.

To inhibit the spread of electrical fires, the junction box and other inter-connecting components for connecting and routing of electric circuits, may additionally contain or have attached, a suppressant dispensing component such as a suppressant chamber, capable of holding a reservoir and releasing a specific volume of fire retardant material into the housing or junction box or the like. The tubing or fluid conduit of the cabling herein, can supply this fire retardant from a central source also, or in some systems charge each such suppressant dispensing component or chamber forming a local reservoir, and communicate additional suppressant from a central or remote source at a distal end of the fluid conduit.

In the preferred mode of the device, the suppressant chamber, when operatively engaged with the fluid conduit, can be composed of a thin housing, which can be ruptured by impact, or which is configured of a thickness and of a material which will melt or open when exposed to a temperature level, indicative or generated by a fire or from overheating caused by resistive heating in wiring, prior to an ignition of a fire. The device should be configured for the fluid tubing or conduit of the cabling to engage and accommodate and dispense fire retardants which are either gas or liquid at room temperature such as Halon, and to provide a continuous or a specific volume communication of such to a locale until turned off.

Additionally preferred, junction boxes for electrical wires and sockets and the like, may contain two or more suppressant ports, configured to engage with the fluid conduit of the cabling to draw retardant material from multiple sources, such as nearby junction boxes, for increased fire fighting capability.

It is preferred in one mode, that a dispensing component such as a suppressant chamber or port include a visible viewable suppressant window, thus allowing for visual confirmation of the presence of a retardant supply therein. The suppressant ports or suppressant chambers can additionally contain one or a combination of fire and retardant activation sensors from a group including heat sensors, microphones, pressure sensors, dyes, color reactive films, accelerometers or contact switches.

One or many flow sensors attached to the fire suppressant buss supplying the fire suppressant to fluid conduit of the cabling, or embedded within the suppressant ports or at locations on the fluid conduit, can also be used to detect a suppressant chamber rupture or a dispensing of retardant, and to send a signal to a central monitoring station, and/or to the circuit breaker supplying the individual electric circuit, to turn off electric power. Additionally, weight measurements can be monitored of fire suppressant tanks and should the weight of the tank drop, the electrical power can be disconnected.

The sensor data can either be displayed proximal to individual suppressant component positions of the system, or through an external light or viewing screen, or viewing window. Such data might also be routed as an electric or preferably wireless signal to a central panel for efficient and simultaneous monitoring and diagnosis of all devices running along individual tubing pathways in the system. Remote display panels should contain means to uniquely identify the retardant tubing in relation to the circuit it supplied to each junction box by description or identification number.

In another or second preferred mode of the device, a local supply of the retardant material may be stored within the suppressant chamber and as such, the suppressant chamber formed as part of or engaged with the junction box, may dispense retardant which may be supplied or replenished by a conduit connection to the suppressant tubing system. All or at least portions of the suppressant chamber should be formed of material, such as HDPE, pfa, nylon or similar polymeric material.

The cabling herein, in all preferred modes, is configured to include and route one or more electric wires, and at least one adjacent fluid conduit, both of which are surrounded by an outer jacket or sheath. This configuration of both wiring and fluid conduits within an axial passage of a surrounding jacket or sheath, allows for easy concurrent installation of both a suppressant carrying conduit for gas or fluid, and electrical wires, in a manner similar to the conventional installation of wiring cables such as ROMEX or shielded cabling. When the fluid conduit is configured to carry fire suppressant, all or portions of the fluid conduit may be formed of material adapted to melt or rupture upon reaching a temperature indicative of fire or overheating from resistive heating or sparking. Thus, the same cabling provides for communication of fluid or gas flame suppressant supplies to all points on the installed electric cable system, from the circuit breaker to all points along the circuit.

In one preferred mode of the device, where suppressant is supplied from one end, the cabling includes a sheath or flexible jacket surrounding the electric cables and a fluid conduit which may include a series of perforations in the sheath. These perforations have been shown in experimentation, to allow for trimming during installation. Further, during testing unexpectedly it was found that the perforations or apertures also provided pathways for the dispensing of fire retardant material, to areas surrounding the cabling, should the tubing or fluid conduit carrying the retardant, be exposed to fire or heat within a wall which is of a temperature which will melt it. Additionally, one or a combination of currently available electrical protection devices can also be employed within the junction box for additional protection from a group including surge protectors, dedicated fuses, arc fault protective devices, and ground fault intercepts.

When the cabling herein is employed in forming electric circuits, the junction boxes or gang boxes and the like, should be composed of one or a combination of durable fire resistant materials such as metal, aluminum, code-allowed plastic, fiberglass, glass or ceramics. The fluid conduit of the cabling should be made of one or a combination of polymeric materials, which are non-reactive from a group including polymeric material, plastic, nylon, PVC, polyethylene, or fiberglass or other material which is inert in the presence of the fire suppressant carried within.

Particularly preferred is the employment of High-density polyethylene (HDPE) for the fluid conduit included in the cabling. HDPE has been shown in most indoor installations of the cabling herein to be superior as fluid conduit to supply retardant. This has been found to be due to HDPE's ability to maintain its structural integrity when exposed to heat below that of fire or potential fire over long periods of time. HDPE, pfa, nylon or other similar materials have a melting point of substantially 400 degrees Fahrenheit which enhances the ability of the fluid conduit to stay strong and resist melting when adjacent to electric circuits which can naturally heat daily during use.

For example, a common electric wiring insulator material is PVC which melts at a first melting temperature which is substantially at 320 degrees Fahrenheit. As such, the material for the fluid conduit should preferably stay intact and not rupture or leak to a second temperature, beyond the first temperature of 320 degrees Fahrenheit, which the wires might reach, carrying a high current load. Thus, nylon with a melting point between 400 to 500 degrees Fahrenheit, or High Density polyethylene, with a melting point substantially at 400 degrees Fahrenheit would be good choices to maintain the fluid conduit intact, unless the circuit or area goes beyond a possible operating temperature where a fire or potential fire is present. In all modes of the device herein, the melting temperature of the fluid conduit, or the second melting temperature, should preferably be above a first melting temperature of the insulation on the electric wires.

However, once the temperature threshold is reached due to overheating of the circuit such as from resistive heating, sparking, or fire, the fluid conduit will rupture and provide suppressant directly at the source of the fire anywhere along any circuit path allowing for purging of conduits systems, concealed wall spaces or within dedicated enclosure assemblies.

Other non metal materials used for the fluid conduit during experimentation, showed signs of softening when exposed to heat over time at temperatures below that which might be considered dangerous in some instances and thus could cause leaking and fire alarms where none are present. Thus, system reliability in longer term installations, and where electric wiring carries current causing normal but ongoing heating, HDPE or nylon would be more preferable for use in the fluid conduit of the cabling when supplying fire suppressant and used with wiring carrying conventional PVC insulation. However, the material for the fluid conduit can be changed or adjusted such that it will fail and release the fire suppressant at a temperature higher than normal operating circuit temperatures.

The cabling system herein is described for the provision of cabling having both electric wires and a fluid conduit for supplying fire suppressant to allow for the easy installation of a combination wiring system and fire suppressing system during construction or retrofit of a building or structure. The cabling of the system herein would be especially useful to protect cruise ships, hospitals, nursing homes, airplanes, submarines, museums, data centers, banks, underground bunkers, as well as the noted use in buildings, businesses, restaurants, and residences, or in any situation where one skilled in the art would consider the ability to automatically sense potential or actual electrical fires and extinguish them.

However, using the uniquely configured cable herein having both a fluid conduit and electrical wires in the same installed cabling component, the cabling can also be employed for other uses where electrical wires along with a fluid conduit would be beneficial. Such could include, but should not be limited to, outside power distribution circuiting, either over roof tops, or in desert (solar farm) style applications, for production plants, in areas of weather having high heat for carrying electricity, and other installations. In these modes, instead of fire retardant or suppressant being charged and delivered by the fluid conduit of the cabling, fluid conduit can be charged with a non conductive coolant, glycol for example, which when flowing though the system can help with heat dissipation.

Additionally, the cabling herein would be helpful in very hot environments, where an engineer must de-rate (increase the size) of the conductors employed for carrying electric current to account for over heating due to ambient temperatures. Using the cabling herein with the unique combination fluid conduit and electrical wiring running adjacent, the user can employ the fluid conduit to flow the fluid to cool the circuits. This could eliminate the expensive de-rating of wiring due to outside or environmental ambient impacts.

Still further, in another mode, components such as lamps could have small canisters of fire retardant mounted within the assembly and trance the power circuit using the fluid gas line from strain relief up to light socket in combination with a simple locking switch, to either directly short the conductor to cause a breaker to trip or open should the canister release.

As such, before explaining at least one preferred embodiment of the herein disclosed invention in detail, it is to be understood that the cabling invention is not limited in its application to the details of construction and to the arrangement of the components in the following description or illustrated in the drawings which primarily are directed to the use of the combination fluid and electrical conduit in buildings, structures and vehicle for fire suppression. The cabling system herein described and disclosed in the various modes and combinations is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

As can be discerned, those skilled in the art will appreciate that the conception upon which this disclosure is based may readily be utilized as a basis for designing of other systems of cabling with concurrent and adjacent positioning of electrical circuits and at least one fluid carrying conduit. It is important, therefore, that the claims be regarded as including such equivalent construction and methodology insofar as they do not depart from the spirit and scope of the present invention.

BRIEF DESCRIPTION OF THE DRAWINGS

The accompanying drawings, which are incorporated herein and form a part of the specification, illustrate some, but not the only, nor exclusive examples of embodiments and/or features of the disclosed system. It is intended that the embodiments and FIGS. disclosed herein are to be considered illustrative of the invention herein, rather than limiting in any fashion. In the drawings:

FIG. 25 depicts a mode of the cable for the system herein having romex type wires running the axial passage of the surrounding sheath along with the fluid conduit.

FIGS. 26A-26C show views of a mode of the cable herein wherein the wire running within the axial passageway within the sheath of the cable is formed in a tubular fashion with wires within insulation which is configured to form a channel providing the fluid conduit.

FIGS. 27A-27B depict views of a mode of the cable for the system herein wherein the wires are in an encircling wind in engagements with the exterior of the polymeric material forming a fluid conduit which runs through the axial passageway of the sheath of the cable.

DETAILED DESCRIPTION OF THE DRAWINGS

Figure 1:
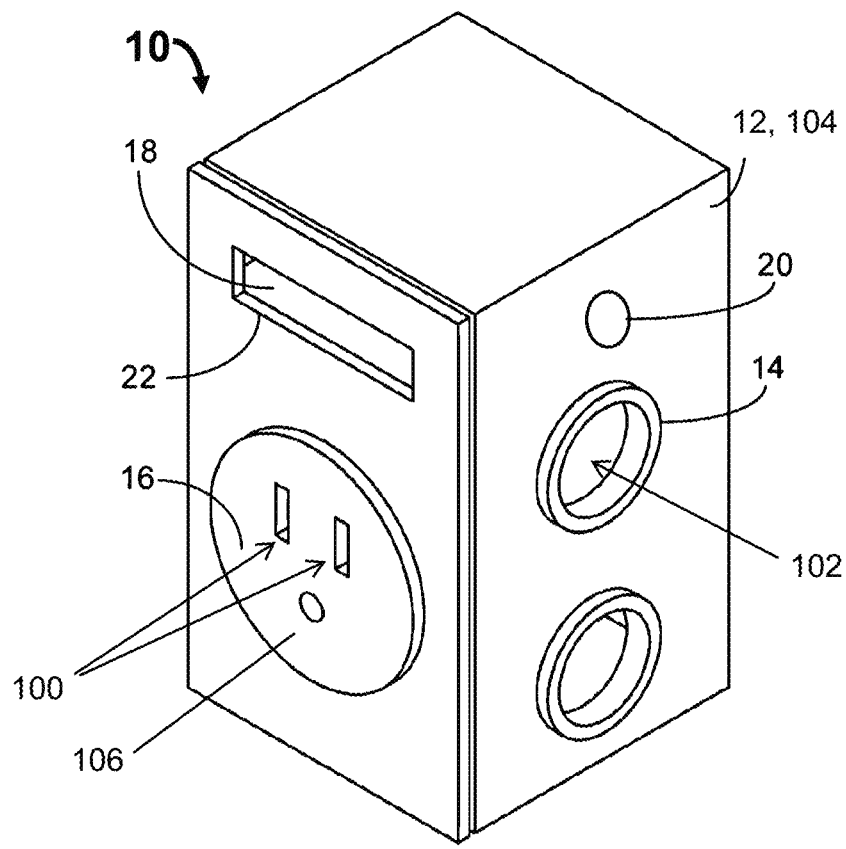
FIG. 1 depicts a perspective view of a junction box employable with the cabling herein, depicted for example in FIGS. 8-17.

Now referring to the drawings in FIGS. 1-40, wherein similar components are identified by like reference numerals, there is seen in FIG. 1, and other drawings where components are configured for operative engagement with the cabling 11 herein, to provide one or a plurality of wires and at least one fluid conduit, in the same cable 11 surrounded by a sheath 24 or cover. As noted, the cable 11 herein is employable with other systems where the parallel and concurrent positioning of both a fluid conduit 26 and electric wires 28 along the entire path of the same cable 11 would be beneficial.

As shown in FIG. 1, when the cable 11, such as in FIG. 3 or FIGS. 8-17 herein, is employed to provide a combination electric wiring system and fluid passage for a fire suppressant system, the cable 11 is operatively engageable with other components in the system such as a junction box 12 or gang box or terminal box component, which is meant as any electrical box or the like used to join wires, engage sockets, lighting, sub circuits or for other purposes for such electrical boxes. The junction box 12 may be configured to house both electric connections therein such as to or between other wires 28, and/or an electric socket 16, and/or a fire suppressant component or chamber 18, or other fire suppression fluid or gas emitter.

Figure 2:
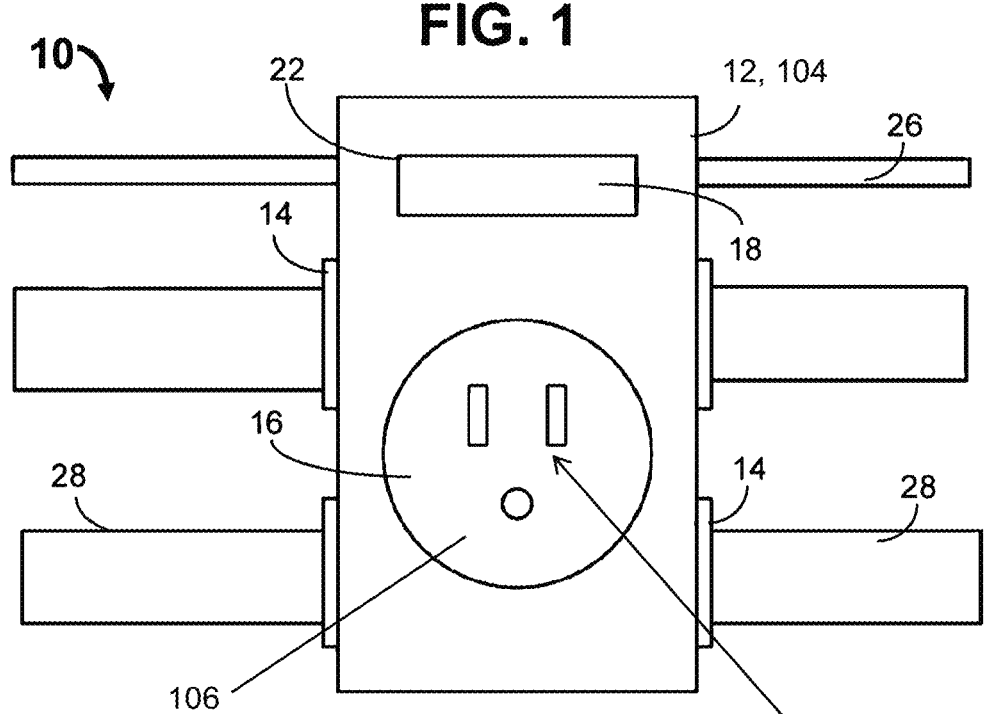
FIG. 2 shows a front view of the junction box of FIG. 1 engaged in operative engagement with the cabling herein carrying both electric wires and one or more fluid conduit lines carrying fire suppressant.
Figure 5:
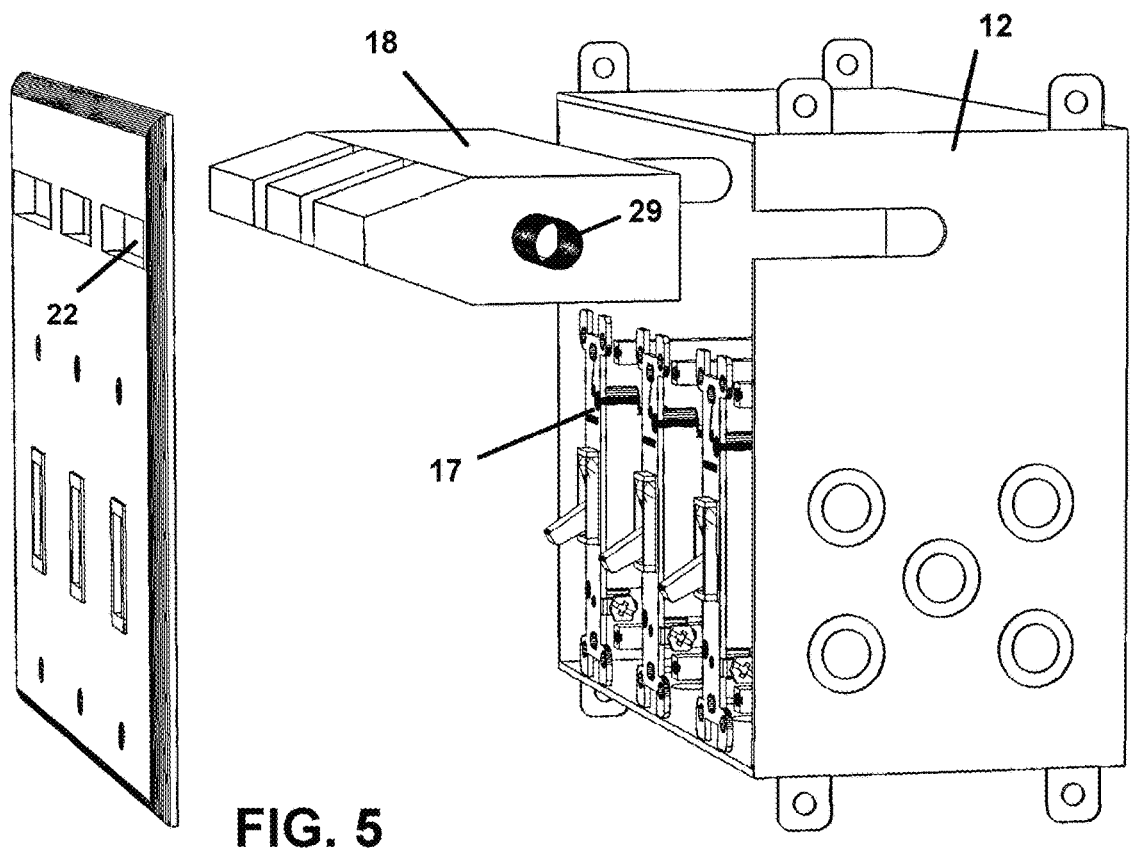
FIG. 5 depicts a gang box configured for positioning of electric switches, having a suppressant chamber with opposing openings, adapted for engagement with the electric wires and fluid conduit of the cabling herein.

The cable 11, when employed in a fire suppressing electrical system 10, is deployable in a variety of configurations, such as with one or more gang boxes or junction boxes 12, shown in FIGS. 1 and 2 and 5, for example. Such a junction box 12, surrounds and secures the electrical connections between two or more of the wires 28 which enter or exit through one or more apertures defining openings 14.

Such junction boxes 12 are known by other names (e.g., connectors) and surround connections mid circuit and are also used for sockets, light fixtures, and a wide variety of connections. However, this description should not be limiting as junction box 12 should be considered to be any housing where cables are joined, divided, connected to an electric device, or for other purposes. Although the openings 14 shown herein in the system 10 consist of circular apertures formed in the junction box 12, alternative constructions can optionally include specific male or female connectors for easy disassembly and access.

As an example, the junction boxes 12 may be configured to engage with conventional sockets 16 or switches 17 of electric fixtures, and/or wire 28 connections with wire nuts, terminal blocks, and other conventionally employed electrical components and junctions to configure the system for engagement of components to the electrical power within. As best illustrated in FIGS. 1 and 2, the junction box 12 may include at least one contact member 100, a chamber 102, and a connector housing 104. The connector housing 104 may have a connector face 106 configured to absorb impact. The connector face 106 may also be referred to herein as an impact absorbing means.

To inhibit the spread of electrical fires, in the system herein, junctions between conduits and wiring in the electrical system such as at any type of junction box 12, may also include a suppressant chamber 18. The suppressant chamber 18 is configured to receive and hold a supply of fire suppressant or retardant such as Halon gas from the fluid conduit 26 which communicates with a central supply under pressure. The suppressant chamber 18 holds such fire suppressant or retardant within an internal cavity defined by the walls forming the suppressant chamber 18. The suppressant chambers 18 may be configured to hold a local supply of retardant therein, should the fluid conduit 26 supplying the system fail, thus maintaining a local sealed supply of retardant or suppressant in each chamber 18 if the fluid conduit 26 is compromised. This can be done using valves on the inlet 29 and an outlet 29 of the suppressant chamber 18. Or the suppressant chamber 18 may be provided a fluid supply from the fluid conduit 26 which is communicated from a reservoir of suppressant.

The system 10 is configured such that any damage to the junction box 12 or its contents, through excess heat or fire, such as caused by electrical short or over-heated wiring 28, will melt and cause a rupture of all or portions of the suppressant chamber 18. Upon the formation of a heat induced rupture, the retardant or suppressant within or supplied to the suppressant chamber 18, is communicated to the fire or overheating area. As shown, the fluid conduit 26, can supply each suppressant chamber 18 and junction box 12, with a continuous pressurized supply of retardant or fire suppressant which will continue to extinguish or prevent a fire from getting larger. As noted, all, or at least portions of the fluid conduit 26 itself, can be formed of material adapted to melt and rupture at a threshold temperature, and communicate the fire suppressant to adjacent areas anywhere the cable may be located in a wiring system, such as in-between junction boxes 12 and fixtures and a circuit breaker buss.

In one preferred mode of the system 10, all or portions of the suppressant chamber 18 can be composed of material, such as HDPE, pfa, nylon or similar polymeric material with a wall thickness which is calculated to melt and or otherwise open when exposed to a temperature over a determined safe level or when exposed to fire. This will cause a continuous dispensing of fire retardant or suppressant to extinguish the fire, or prevent one, by preventing oxygen from reaching the heat source. With regard to the wall thickness, it can calculate to fail, due to the internal pressure within the suppressant chamber 18, when heated to a point the wall will distend and fail.

Figure 4:
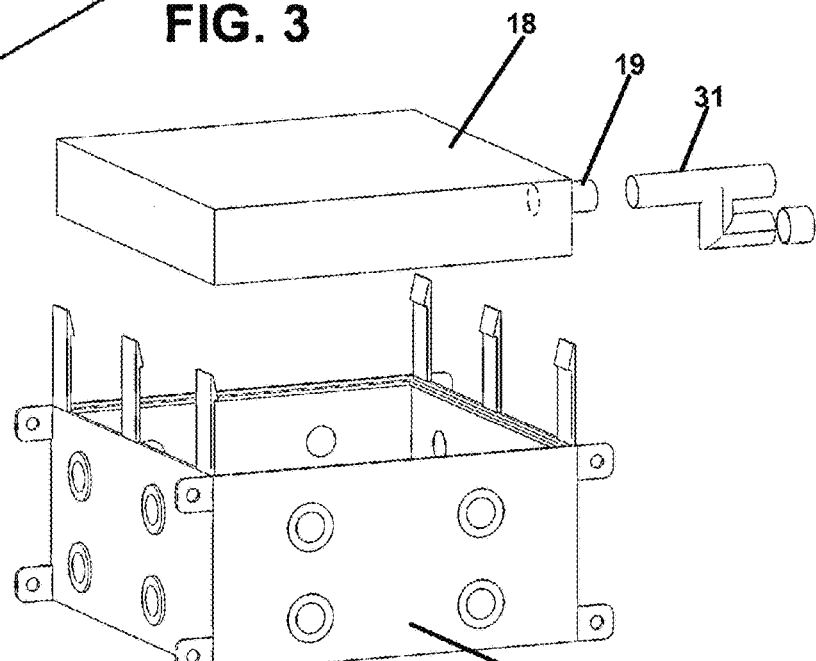
FIG. 4 shows an electric junction box configured for engagement with the cabling herein, showing in exploded view, a suppressant chamber engaged as a cover.

Shown in FIGS. 2 and 4 and 5, the junction box 12 is adapted to operatively engage with the fluid conduit 26 either through a conduit opening 20, or by communication of the entire cable 11 through an opening 14. Each suppressant chamber 18 is configured for a sealed engagement with the fluid conduit 26 running through the cable 11 herein, to provide the suppressant chamber 18 with a fluid or gas suppressant supply. The opening 14 may also be referred to herein as a first port of the junction box 12. The conduit opening 20 may also be referred to herein as a second port of the junction box 12.

For such engagement for example, the suppressant chamber 18 can be configured with one or a plurality of flanges 19 with axial passages into the interior cavity of the suppressant chamber 18, which act as inputs or outputs for fluid to continue the communication of the suppressant through the chamber 18 to subsequent chambers 18 along a fluid circuit with connections therebetween by the fluid conduit 26 running through the axial passage 23 of the sheath 24 of the cable 11 along with the wires 28. The axial passages may alternatively be referred to herein as a second port of the junction box 12.

Preferably, the junction box 12 should include a suppressant window 22 for visual inspection to confirm a local supply of retardant or suppressant is present within the suppressant chamber 18 which is viewable through the window 22.

Figure 7:
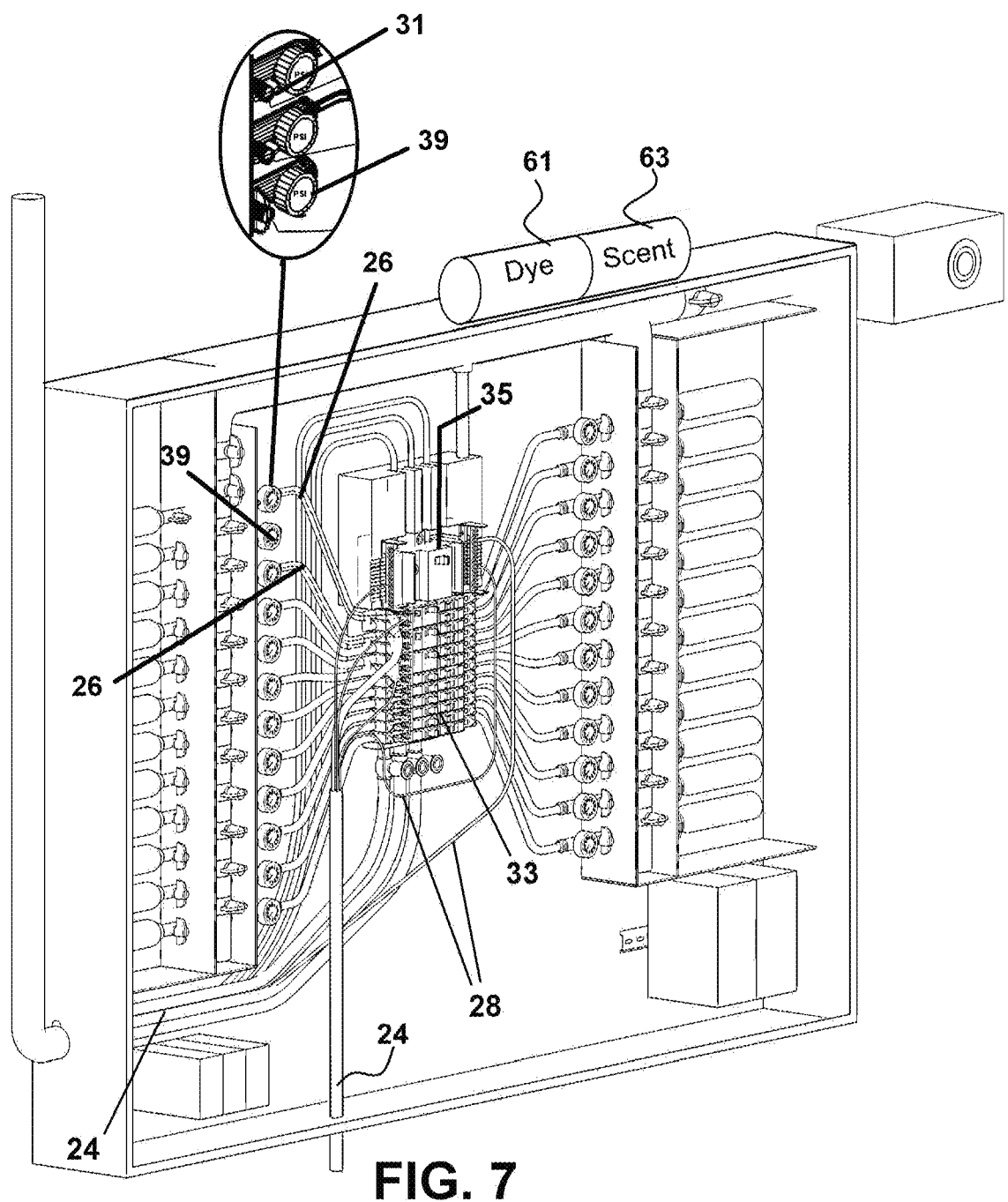
FIG. 7 depicts a mode of employment of the cabling herein in a fire suppressant system, showing the combination electrical buss for electric circuit breakers and the retardant supply buss having an optional dye and/or scent supply therefor, positioned to route retardant through the fluid conduit of the cabling, where both the fluid conduit and electric wires run in the cabling in a substantially parallel communication to different electric circuits.

One or a plurality of flow and/or pressure sensors 31 may be placed in communication with suppressant axial passage 23 running through the fluid conduit 26 such as in FIG. 7. For example, sensors 31 such as pressure supply meters, flow sensors, or pressure sensors, shown in FIG. 7 and/or other electronic sensors which may discern a pressure drop in a fluid conduit 26 circuit, can be operatively engaged with each fluid circuit which parallels an electric circuit running through a cable 11.

The sensor data can either be displayed proximal to the system 10, through an external light or screen, or routed to a central safety video display panel, for efficient and simultaneous monitoring and diagnosis of all systems 10, or in a particularly preferred mode, such as shown in FIG. 7 for example, a signal from the sensors 31 will be communicated in a wired or wireless fashion to a circuit breaker 33 powering the same wire or wires 28 running through a cable 11 with a fluid conduit 26. The signal will cause the circuit breaker 33 to open, and switch off electric power to the wires 28 in the cable 11 of the circuit where suppressant is being dispensed and which has caused the sensor 31 to generate a signal. Remote display panels, if displaying a sensor signal generation, should contain means to uniquely identify the location and circuit of the sensor 31 generating it. Such a signal could be generated by a weight sensor 31 to allow the system to monitor the weights of the fire suppressant tanks and should the weights fall below a certain threshold, it can shut that circuit down as well.

Figure 3:
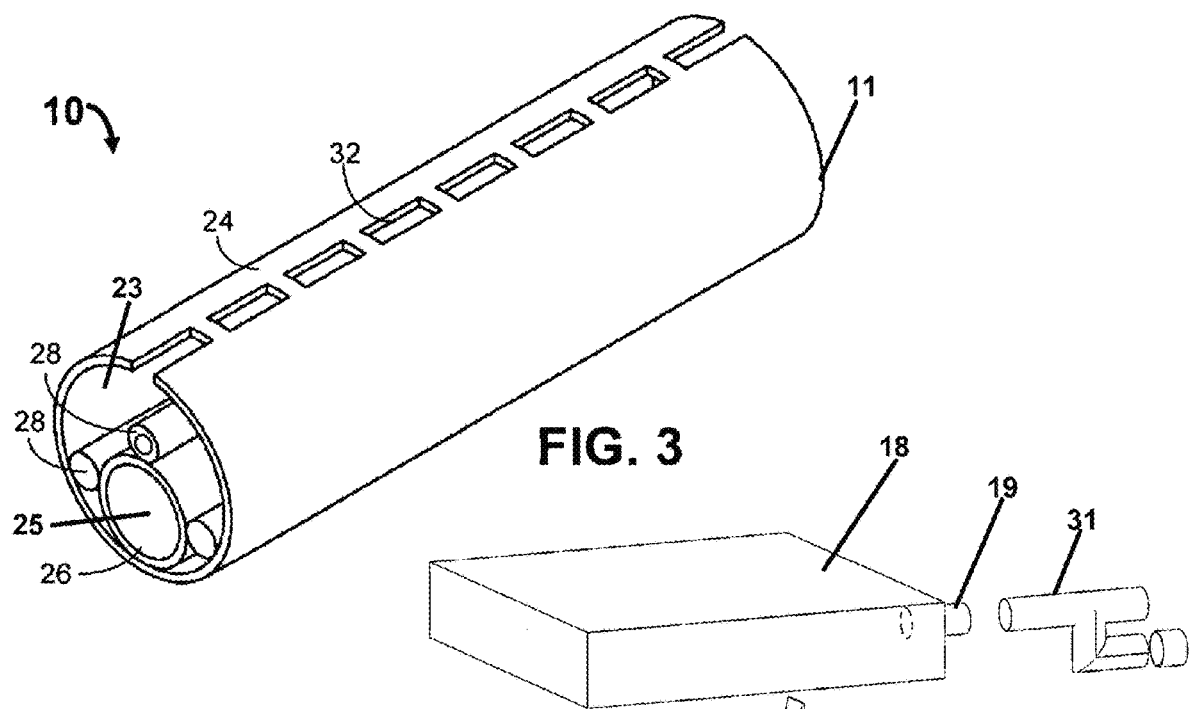
FIG. 3 displays a perspective view of one preferred mode of the cabling of the system herein which is formed with wires for electric communication in parallel adjacent positioning with at least one fluid conduit configured for fluid or gas flow therethrough, such as a fire suppressant fluid.

Depicted in FIG. 3 is one example of the cable 11 herein, showing the sheath 24 forming an axial passageway 23 which provides a pathway for one or more wires 28, and at least one adjacent running fluid conduits 26, as shown, although a plurality of fluid conduits 26 can be included in a cable 11.

Formation of the cable 11 with wires 28 and a fluid conduit 26 running in an axial passageway 23 defined by the surrounding sheath 24, allows for easy instillation of the cable 11 in a fashion much like conventional conduit routed electrical systems, thereby allowing concurrent positioning of both wires 28 and a fluid conduit 26 throughout the system.

Figure 10:
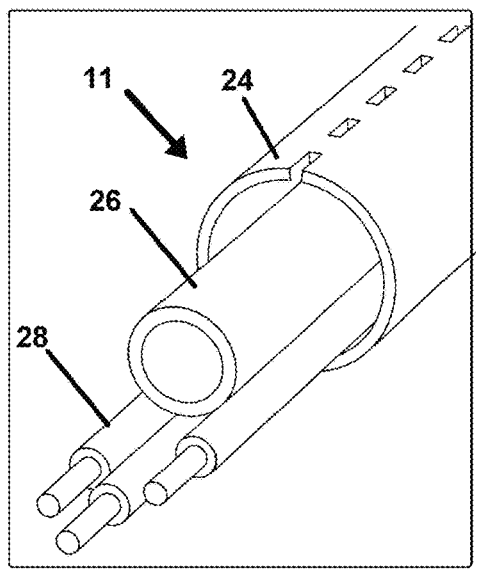
FIG. 10 depicts the cabling herein in another mode with a plurality of electric wires and at least one fluid conduit running axially through the surrounding sheath which has perforations or sequential aligned apertures formed therein.
Figure 15:
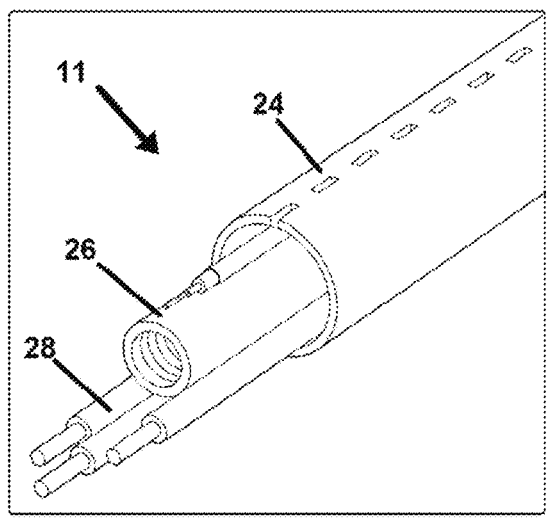
FIG. 15 depicts the cabling of FIG. 14 showing perforations or sequentially aligned apertures formed in the sheath providing the axial passage for the fluid conduit and wires.

As shown in FIGS. 3, 10, and 15, the sheath 24 may include an array of aligned apertures 32 which allow for easier trimming during installation. Further, these apertures 32 provide vents to communicate fire suppressant from the fluid conduit 26 if a fire or heat melts the fluid conduit 26 to a rupture in between junction boxes 12. The fluid conduit 26, as noted, should be made of any non-reactive, durable material such as polymeric material, nylon, PVC or fiberglass, or most preferably HDPE or PFA, which has a melting point which will cause a rupture the fluid conduit 26 at an appropriate temperature above the operating temperature of the wires 28, to extinguish or retard a fire if needed. The flexible sheath 24 would also preferably be formed of a similar material to that of the fluid conduit 26, such that it will not melt or rupture in areas where the fluid conduit 26 is also adapted to operate which may be hot.

Figure 4A:
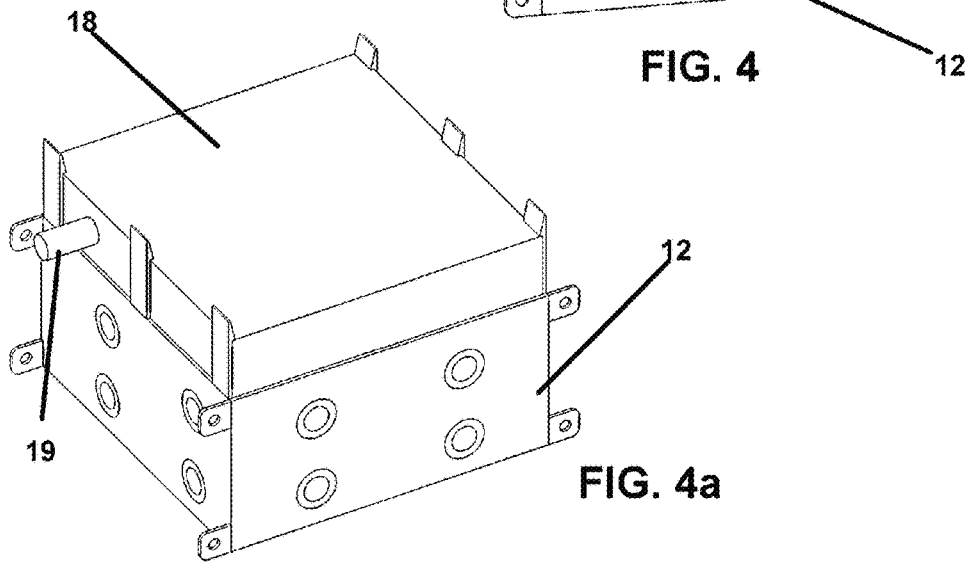
FIG. 4*a* depicts the junction box of FIG. 4, assembled.

Shown in FIGS. 4 and 4a is a mode of the junction box 12 which is depicted with the suppressant chamber 18, configured to engage and provide a removable cover for the internal cavity of box 12. Such would work well at junctions between main and sub circuits of the electrical system.

In FIG. 5 there is shown a gang box or junction box 12 configured for engagement of electric switches 17. This mode of the junction box 12 is engaged with a suppressant chamber 18 with connections 29 on both ends, for the fluid conduit 26 for a throughput of suppressant supplied by the fluid conduit 26 through the chamber 18 and on to a subsequent chamber 18. Windows 22 in the faceplate allow for viewing of the contents of the suppressant chamber 18.

Figure 6:
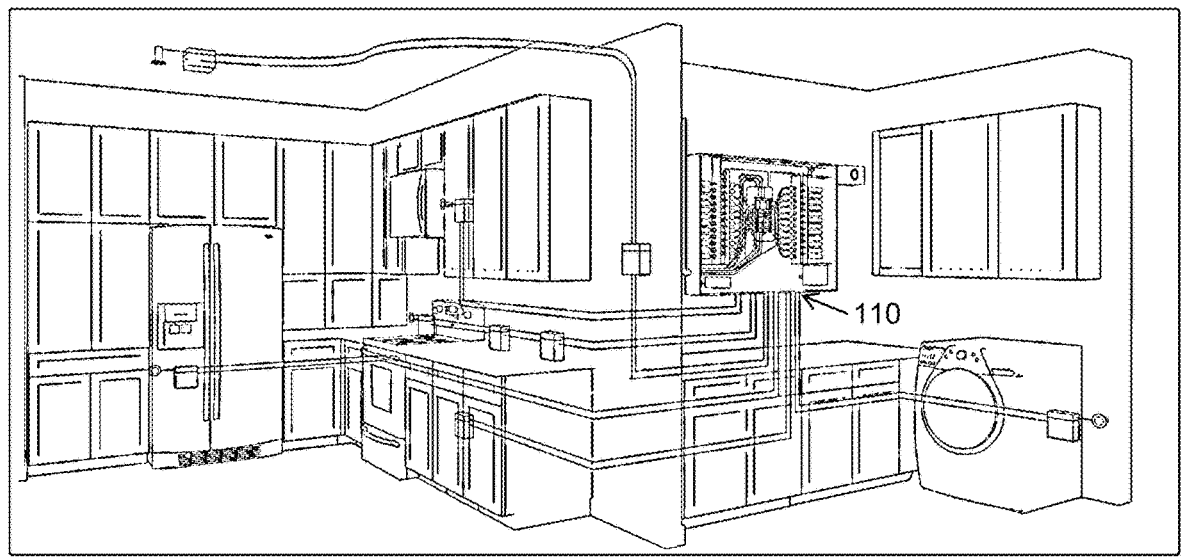
FIG. 6 shows an example of the cabling herein employed as a fire suppressant system having both electrical circuits and fluid conduits carrying fire suppressant, running from a central position or switch room.

In FIG. 6 there is depicted an example of the system 10 herein using the cable 11 for positioning of both electrical circuits of the wire 28 and fire suppressant circuits of the fluid conduits 26 running to remote positions from a main electrical connection buss and retardant supply buss. As illustrated in FIG. 6, the system 10 may include an adapter charger 110 for the interconnection of the cable 11 to the main electrical connection buss and the retardant supply buss.

Shown in FIG. 7, as noted above, shows the system where various circuits of the fluid conduit 26 of each cable 11 connect to a pressurized suppressant supply in a fluid buss. The fluid buss also allows for communication under pressure of one or both of a dye 61 or scent 63 to the fluid supply. The dye may be fluorescent or colorized otherwise easy to see and the scent should be one which is easily sensed by humans. Such will allow for easier maintenance of the system wherein small leaks can be determined by dye 61 on surfaces adjacent leaks, and even hidden leaks which cannot be seen can be detected by the scent 63 which would permeate surrounding areas.

The wires 28 for each respective cable 11 connect to one of the breakers 33 of an electric buss 35 portion as shown in the example of a combination electric and fluid buss shown in FIG. 7. Gauges 39 and/or sensors 31 are engaged to suppressant circuits of each fluid conduit 26 and will sense the current pressurization level in each such circuit formed by a fluid conduit 26 in a cable 11. The fluid conduit 26 and wires 28 of each cable 11 are routed through the axial passageway 23 of the sheath 24 with the wires 28 therein, thereby providing parallel and concurrent communication of electrical power and fluid such as fire suppression along the entire route of each individual circuit of the electrical system.

Figure 8:
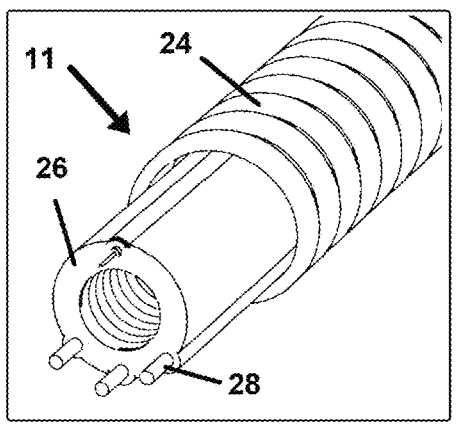
FIG. 8 shows the cabling herein having a fluid conduit with wiring positioned in the sidewall forming the fluid conduit and a surrounding flexible sheath.

As noted, FIG. 8 shows the cable 11 herein having a fluid conduit 26 and a plurality of wires 28, both positioned in axial passage 23 of a surrounding flexible sheath 24 holding the components of the cable 11 adjacent. In the mode of FIG. 8, the material forming the sidewall of the fluid conduit 26, is engaged with the plurality of wires 28 during extrusion of the fluid conduit 26. Thus, the fluid conduit 26 and plurality of wires 28 running through the material forming it, are a unitary structure of wires 28 and fluid conduit 26.

Figure 9:
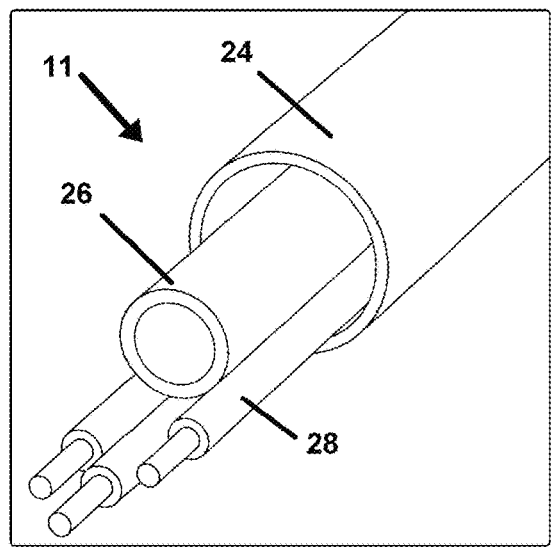
FIG. 9 shows the cabling herein formed with a fluid conduit and wiring running through the axial passage of the surround flexible sheath.

In FIG. 9 is shown the cable 11 or cabling herein configured with a fluid conduit 26 and wires 28 running through the axial passage 23 of the surround flexible sheath 24. The cable 11 so formed, can be wound into rolls or spools which can be unwound and installed in a conventional fashion thereby encouraging widespread use.

FIG. 10 depicts the cable 11 herein in another mode with a plurality of three electric wires 28 and at least one fluid conduit 26 running axially through the surrounding sheath 24. The wall of the sheath 24 includes aligned and sequentially positioned apertures 32 which as noted allow for easier cutting of the cable 11 as well as provide vents for passage of fire suppressant from the interior of the sheath 24.

Figure 11:
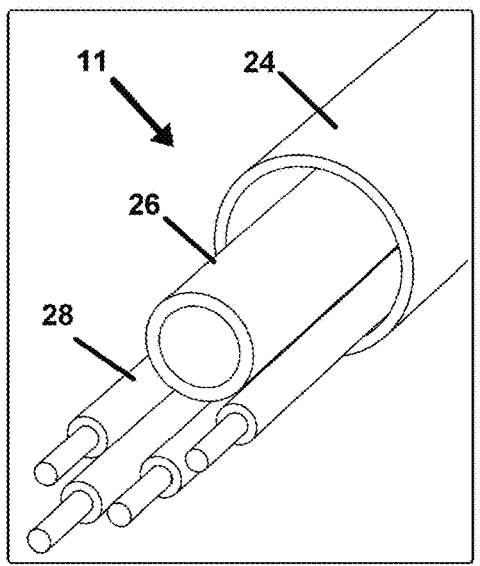
FIG. 11 shows the cabling of the system herein wherein the plurality of wires carried in the sheath axial passage is four, and a single fluid conduit runs parallel thereto.

FIG. 11 shows the cable 11 of the system herein wherein the plurality of wires carried in the sheath 24 axial passage is four, and a single fluid conduit 26 runs parallel thereto.

Figure 12:
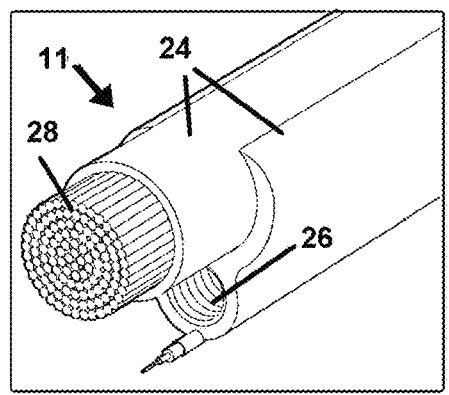
FIG. 12 depicts a mode of the device wherein electric wires are positioned within the material forming the fluid conduit in a unitary structure of cables and fluid conduit.
Figure 13:
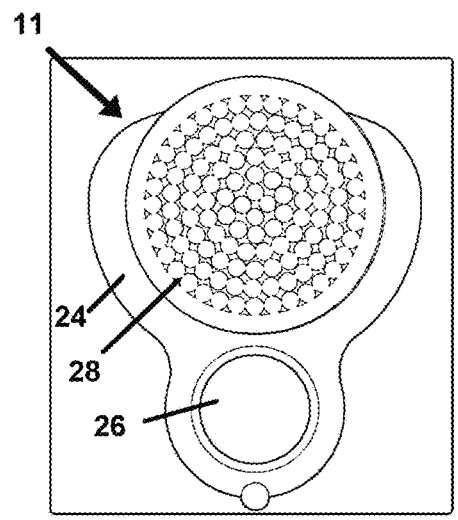
FIG. 13 is an end view of the mode of cabling of FIG. 12.

FIGS. 12 and 13 show a mode of the cable 11 wherein electric wires 28 are positioned during extrusion within the material forming the fluid conduit 26, and form the fluid conduit 26 and wires 28 in a unitary structure.

Figure 14:
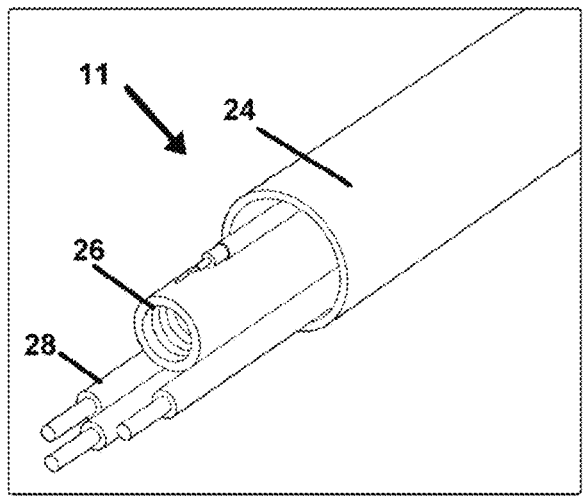
FIG. 14 shows that the cabling can carry both a plurality of electric wires as well as one or more communications cables which run within the axial passage of the surrounding sheath along with the fluid conduit.

FIG. 14 shows that the cable 11 or cabling with a plurality of electric wires 28 as well as one or more communications cables 28a which run within the axial passage of the surrounding sheath 24 along with the fluid conduit 26. As with all other modes of the formed cable 11, it can be wound on large reels and dispensed during installation.

FIG. 15 shows the cable 11 of FIG. 14 having the sequentially positioned apertures 32 formed in the sheath 24 providing the axial passage for the fluid conduit 26 and wires 28.

Figure 16:
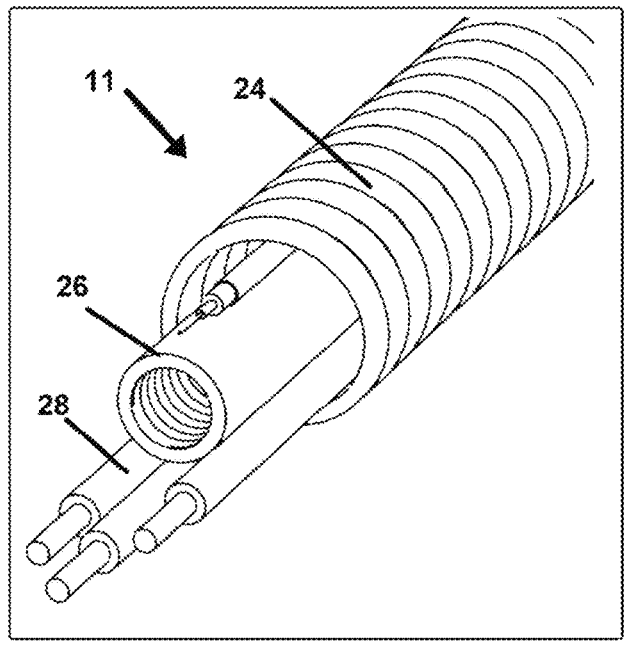
FIG. 16 shows a mode of the cabling herein having an flexible but armored sheath surrounding the axial passage carrying at least one fluid conduit and one or the shown plurality of wires for electric current.

In FIG. 16 is shown the cable 11 or cabling herein having an armored sheath 24 surrounding the axial passage carrying at least one fluid conduit 26 and one or the shown plurality of wires 28 for electric current.

Figure 17:
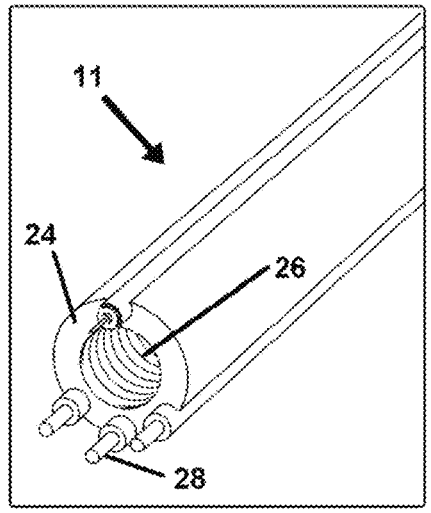
FIG. 17 depicts the cabling herein, wherein the electric wires are carried in the sidewall forming the fluid conduit herein, where the wires may be extruded with the fluid conduit, or pressed into channels formed in the exterior of the fluid conduit.

FIG. 17 depicts the cable 11 or cabling herein, wherein the electric wires 28 are carried in the sidewall forming the fluid conduit 26 herein. As shown, the wires 28 may be pressed into channels formed in the exterior of the sheath 24 surrounding the fluid conduit 26.

Figure 18:
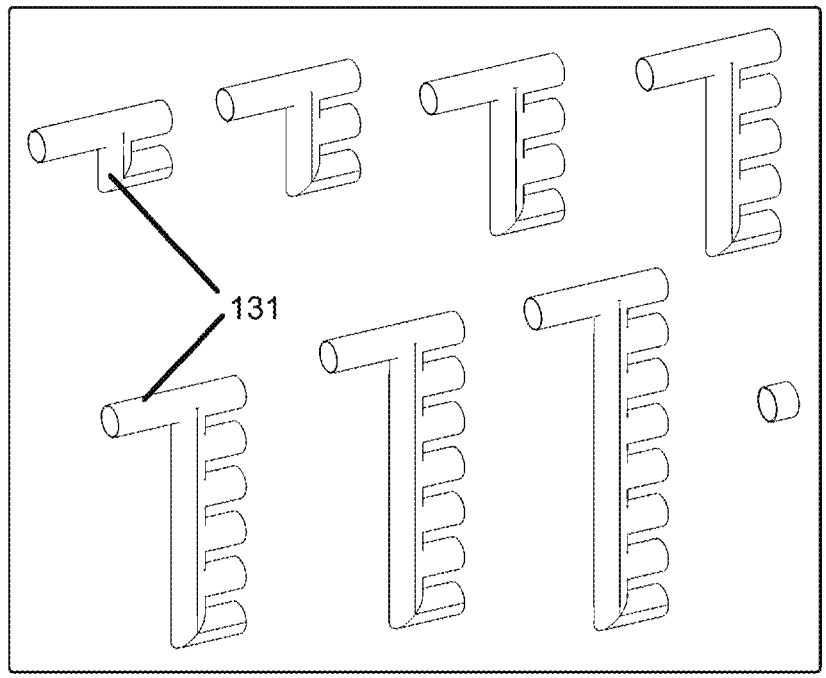
FIG. 18 shows differing connectors for engaging the fluid conduit of different cables for fluid flow therebetween.

FIG. 18 shows differing connectors 131 for sealed engagement between ends of the fluid conduits 26, allowing a number thereof to be fluidly engaged.

Figure 19:
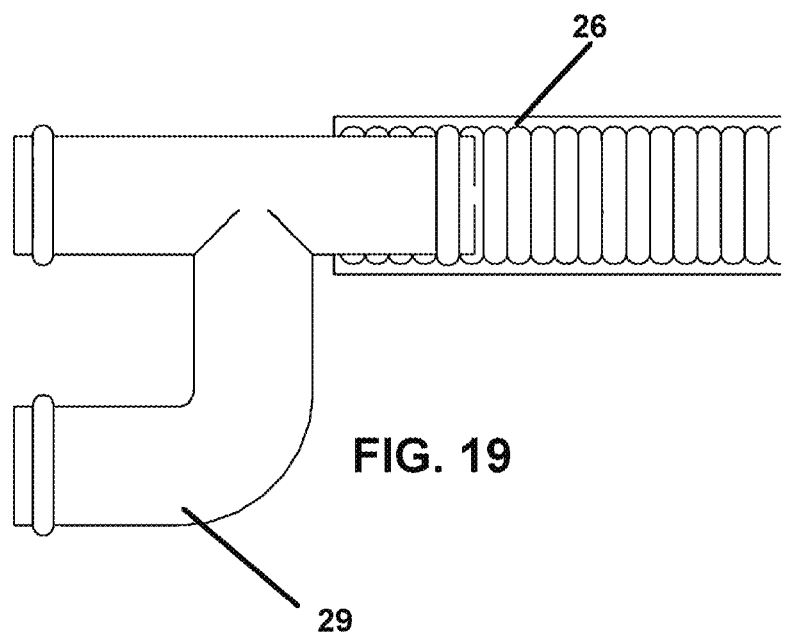
FIG. 19 depicts a sliced view showing an interior passage of a fluid conduit in a sealed engagement with a fluid connector such as in FIG. 18.

In FIG. 19 is depicted a sliced view showing an interior passage of a fluid conduit 26 in a sealed engagement with a fluid connector such as any of those in FIG. 18.

Figure 20:
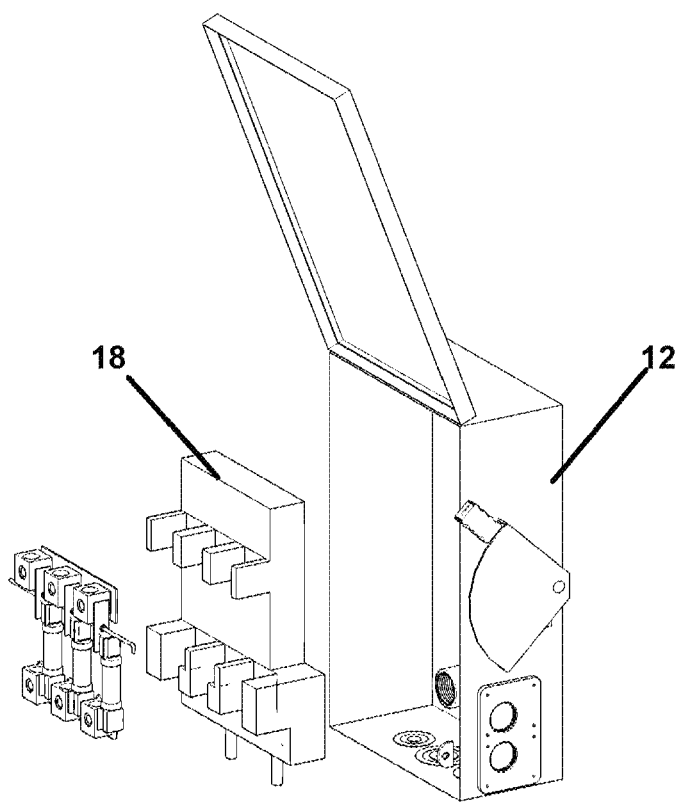
FIG. 20 shows exemplars of a sub panel, in exploded view, which is adapted for engagement with both the wires, and the fluid conduit of the cabling herein, to provide electric power to the buss and fire suppressant to the fluid dispenser.
Figure 21:
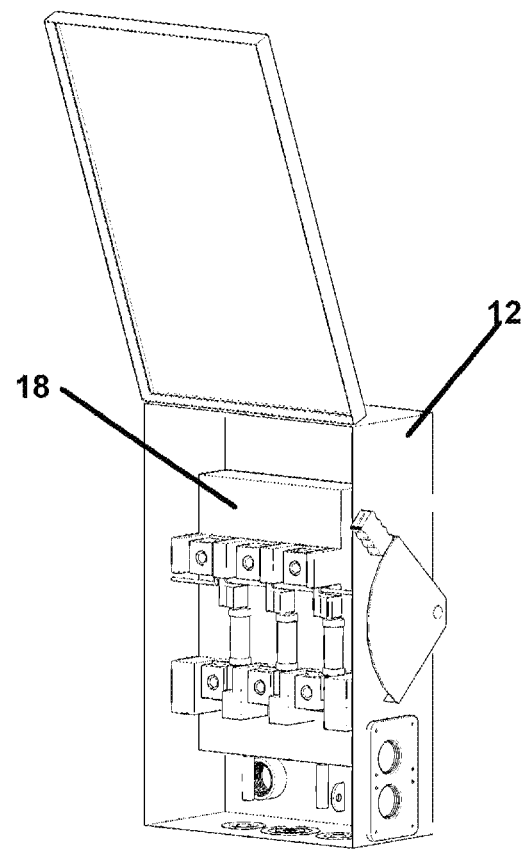
FIG. 21 shows the sub panel of FIG. 20 assembled and ready for engagement with both the wires and fluid conduit of the cabling herein.

In FIGS. 20-21 are depicted exemplars of a sub panel junction box 12 of an electric system, which is adapted for engagement with both the wires 28, and the fluid conduit 26 of the cable 11 herein, to provide electric power to the buss and fire suppressant to the fluid dispenser. The suppressant chamber 18 in the mode shown, has multiple inlet and outlet flanges 19 to allow the flow of suppressant to flow into and through the chamber 18 downline to the rest of the circuit.

Figure 22:
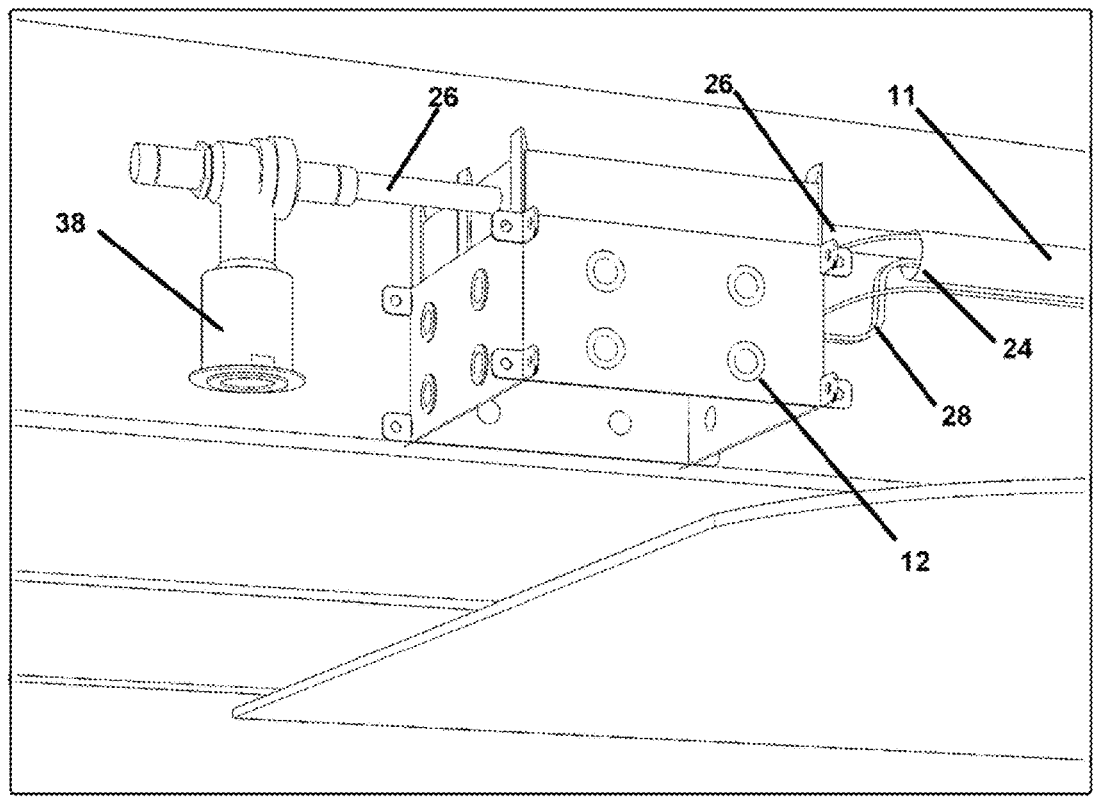
FIG. 22 shows the cabling herein with the wires and fluid conduit of the cabling in operative engagement with a junction box, and fluid dispenser showing a fluid dispensing sprayer engageable with the fluid dispenser.

FIG. 22 shows the cable 11 herein with the contained wires 28 and fluid conduit 26 of the cable 11, in operative engagement with a junction box 12, and fluid dispenser 18 engaged with a fluid dispensing sprayer 38 adapted to direct a downward flow of suppressant when activated by heat above a predetermined level. Such would be employed for example on a ceiling of a room to be protected.

Figure 23:
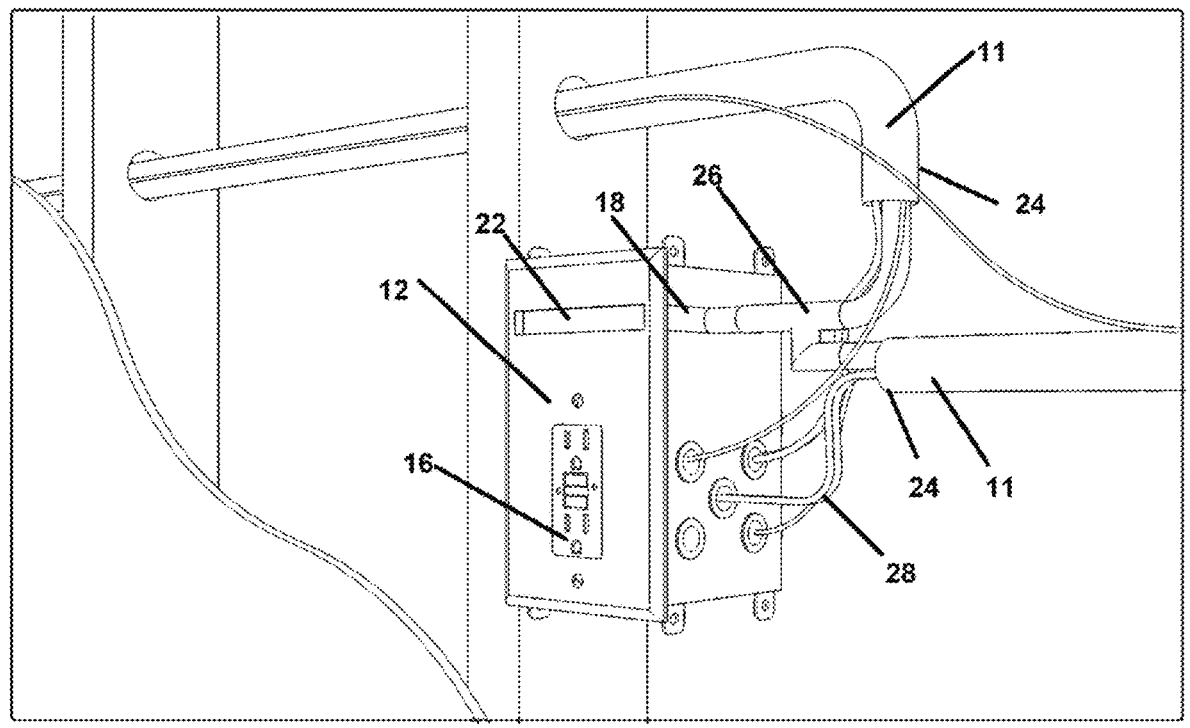
FIG. 23 shows the cabling of the system herein, connected in a circuit for both the fluid conduit and wiring.

Shown in FIG. 23 is a depiction of the cable 11 herein, installed in a structure and providing both wiring 28 and a fluid conduit 26 which may be operatively engaged with a junction box 12 hosting a socket 16, to provide fire suppressive material through the fluid conduit 26 to the depicted junction box 12 and a subsequent junction box 12 or other point serviced by the cable 11 extending therefrom.

Figure 24:
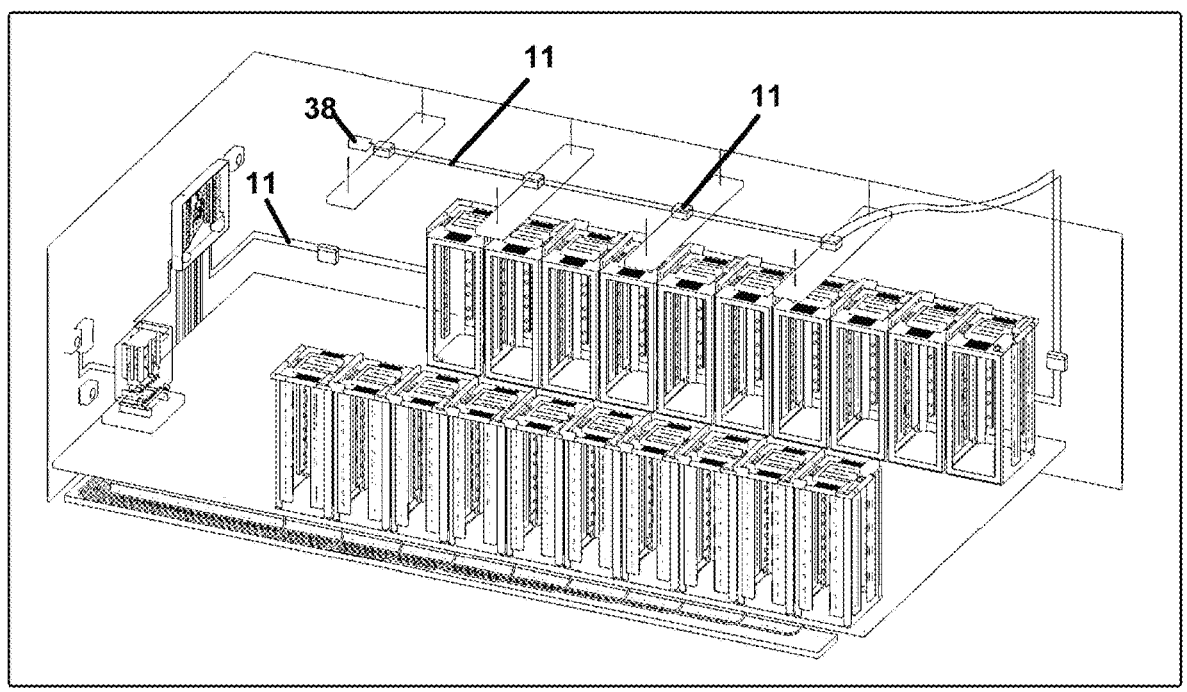
FIG. 24 shows the cabling of the system herein providing both wiring and a fluid conduit operatively engaged to provide fire suppressive material for both socket connectors as well as overhead dispensers of fire suppressant, such as in a server room.

An example of an installation of the system is shown in FIG. 24 where the cable 11 provides the path for fire suppressive fluid for both socket connectors as well as overhead dispensers or sprayers 38 of fire suppressant, such as in a server room. The cable 11 may be any derivation of cable 11 shown and described herein as may the junction boxes 12 and other components.

FIG. 25 depicts a mode of the cable 11 for the system herein configured with romex type wires 28 running the axial passageway 23 of the sheath 24 surrounding the components of the cable 11. The fluid conduit 26 having an axial passage 25 for retardant communication therethrough is shown running adjacent the wires 11 formed into the romex with all running through the axial passageway 23 of the sheath 24 which is shown with apertures 32 therein.

The cable 11 herein as noted may be configured to form the axial passage 25 therein or position the fluid conduit 26 having an axial passage 25 therein which runs axially through the cable 11. This is shown in FIGS. 26A-26C which depict versions of the cable 11 employable herein wherein the wires 28 running within the axial passageway 23 within the sheath 24 are extruded or molded into in polymeric insulation material extruded to define sidewalls surrounding an axial cavity 27. This axial cavity 27 itself may be employed for the axial passage 25 in substitute of a fluid conduit 26, or as shown in FIG. 26C the fluid conduit 26 can run axially through the axial cavity 27.

Another mode of the cable 11 employable with the system herein is shown in FIGS. 27A-27B. As shown, some or all of the electric wires 28 may be engaged in a spiral wound or encircling winding engagement with the exterior of the polymeric material forming a fluid conduit 26. This spiral winding has been found in experimentation to provide excellent phase separation to cancel out flux and minimize electric noise generation. The fluid conduit 26 so formed is provides the axial passage 25 for retardant communication through the system as needed. The wires 28 in this spiral winding or encircling engagement with the sidewall of the polymeric material forming the fluid conduit 26 may be co-molded therein or as shown, may be frictionally or adhesively engaged within slots 42 formed to wind around the exterior circumference of the fluid conduit 26. The sheath 24 with apertures therein would surround the wire-encircled fluid conduit 26 in same fashion as in other modes shown herein.

Figure 28:
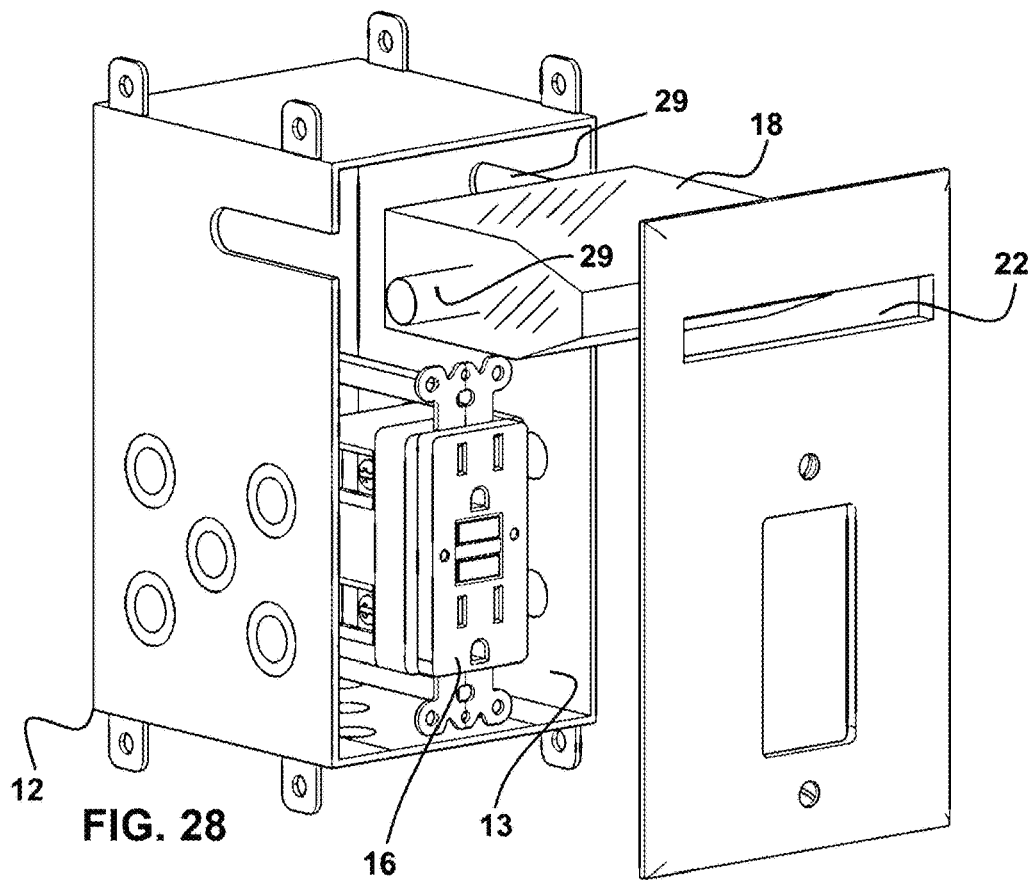
FIG. 28 shows a junction box adapted for engagement of a socket therein and showing a chamber for holding retardant fluid therein which is slidably engageable into the junction box and has connectors for provision of retardant fluid flow into and out of the chamber.

Shown in FIG. 28 is a mode of the junction box 12 which is configured to surround an electric connection such as a switch or depicted socket 16 within the cavity 13 surrounded by sidewall of the junction box 12. In this configuration, a chamber 18 for holding a local supply of retardant fluid therein, is slidably engageable into the cavity 13 formed in the junction box 12. As shown the chamber 18 has at least one connection 29 as an inlet for retardant into the chamber 18 and preferably has two connections 29 to allow a pressurized flow of retardant into, through, and out of the chamber 18. A window 22 formed into the socket or switch cover allows for both a viewing of the chamber 18 for visual confirmation of the presence of retardant therein, and for disbursement of fire retardant from the suppression chamber 18 and into non concealed areas such as interior room space areas surrounding the junction box 12, should temperatures in that surrounding area, reach the melting point of the material forming the chamber 18 within the area communicating through the window 22.

Figure 29:
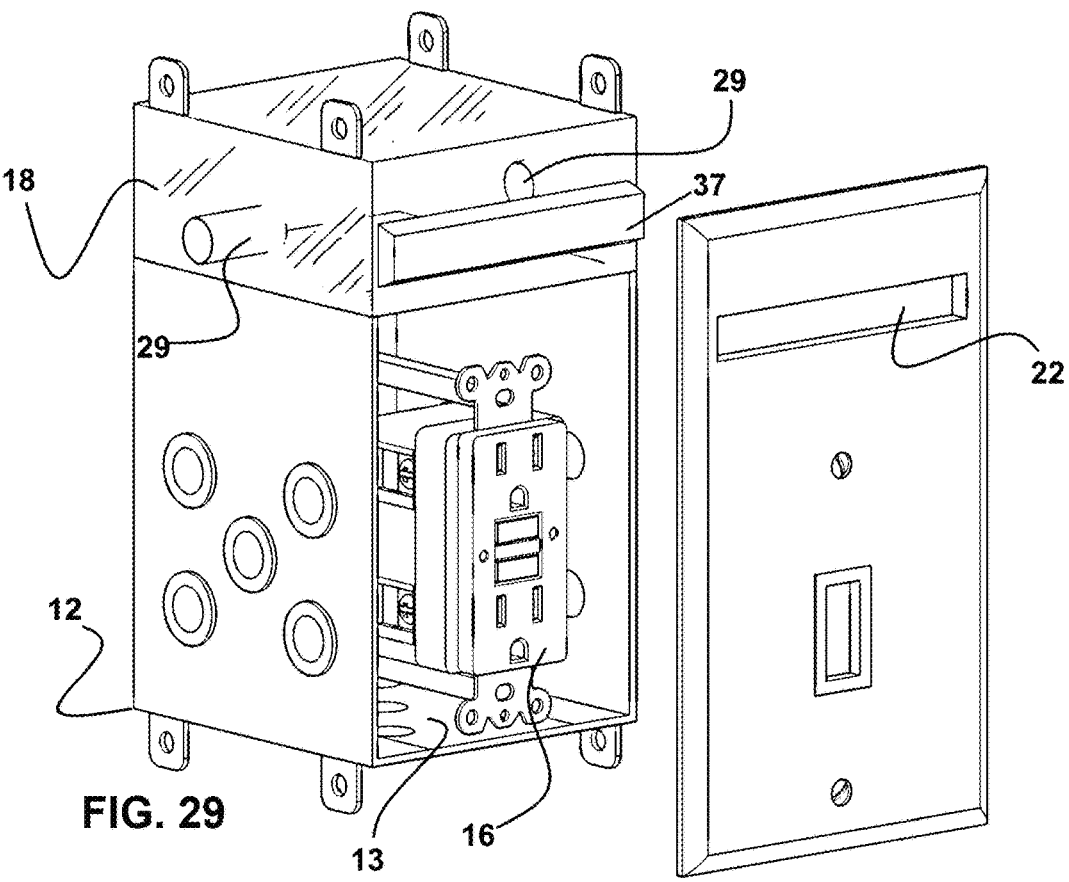
FIG. 29 depicts a junction box of the system herein which has the fluid chamber formed as an upper portion of the junction box wherein electrical connections, such as to a socket, are positioned within the cavity of the junction box at a position underneath the fluid chamber.

In FIG. 29 is shown a junction box 12 of the system herein which has the fluid chamber 18 engaged to form an upper portion and top sidewall of the junction box 12 wherein electrical connections such as to a socket 16 are positioned within the cavity 13 of the junction box 12 defined by the sidewalls of the junction box 12. As noted above, by junction box 12 wherever used herein, is meant any housing employed in an eclectic wiring system wherein electric connections are made between wires 28 carrying electric current be those connects by wire nuts, crimping, electric receptacles such as a socket 16 or switch, or any other conventional electric connection positioned within the cavity 13 of the junction box 12.

As shown in FIG. 29, in this mode of a junction box 12, with the suppressant chamber 18 forming one sidewall of the cavity 13, heat within the cavity 13 sufficient to melt the wall of the suppressant chamber 18, formed as part of the junction box 12 and in communication with the cavity 13, will cause fire retardant to flood the cavity 13. Further, a projecting portion 37 of the suppression chamber 18 formed as part of the junction box, projects therefrom in a position to project into and through the window 22. This positions the projecting portion 37 of the suppression chamber 18 within the window 22. Thus the projecting portions 37 can be made to project through and forward of the window 22 in the cover and into surrounding open room spaces where electrified content items may connect to junction box.

Figure 30:
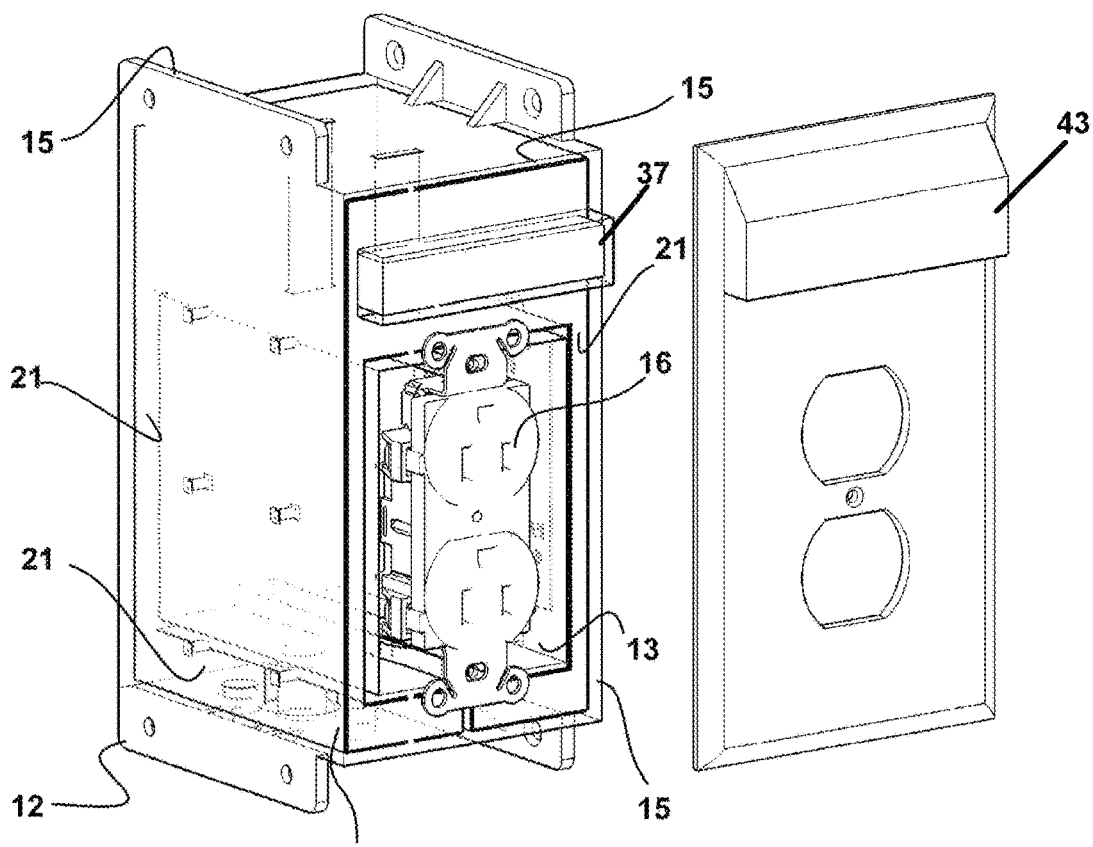
FIGS. 30-30A show front and rear views of an especially preferred mode of a junction box of the system herein which is formed in a unitary structure of chamber and junction box wherein the formed chamber surrounds the internal cavity of the junction box which may be adapted for mounting or housing any electric connection such as the depicted socket engaged therein.
Figure 30A:
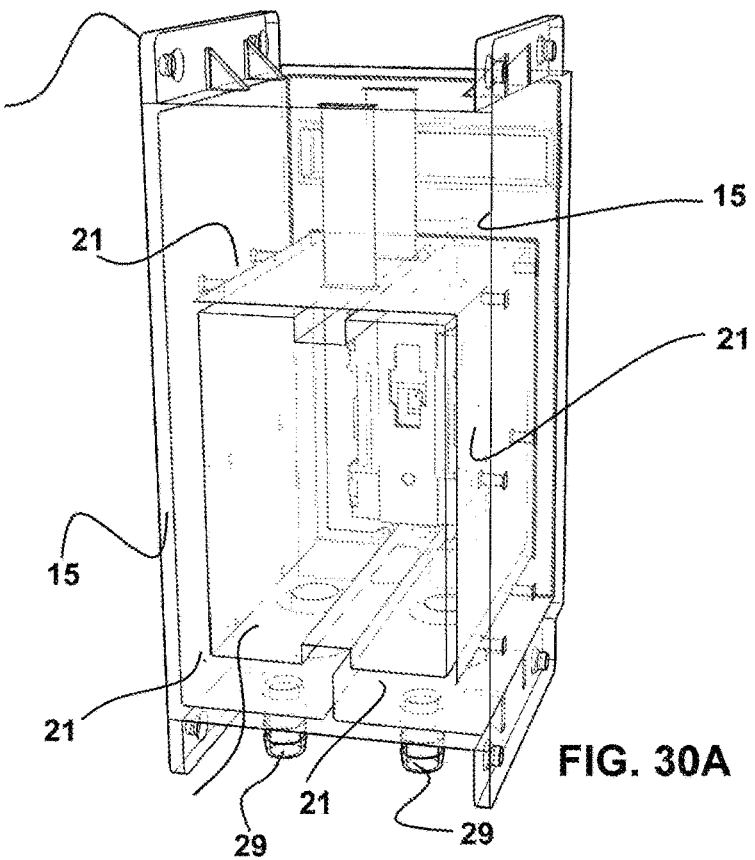

In FIGS. 30-30A are depicted front and rear views of an especially preferred mode of a junction box 12 of the system herein. The junction box 12 is shown with transparent sidewalls 15. As can be seen, the sidewalls 15 defining the cavity 13 of the junction box 12 have connected passages 21 within some or all of the sidewalls 15 which define the cavity 13 of the junction box 12. Connections 29 for provision of fire retardant communicate with the passages 21 on one sidewall to communicate the fire retardant into the passage 21 of at least one sidewall, and preferably with passages 21 in other sidewalls 15 surrounding the cavity 13 such that fire retardant will flow into and through all of the passages 21 where positioned in sidewalls 15 of a junction box 12.

This mode of the system herein configures portions of the junction box 12 itself to form the suppression chamber 18 in a unitary structure. In operation, should the electric connection within a cavity 13 of a junction box 12 overheat, at least one of the surfaces of the sidewall 15 defining the suppressant chamber within the junction box 12 and facing the cavity 13, will melt and cause a communication of fire retardant from a passage 21 in that sidewall 15 into the cavity 13. Alternatively, portions of common walls between the sidewall 15 and the cavity 13 may be fully or partially formed of material adapted to melt at the temperature slightly higher or lower than that of the insulation on the wires and melt when temperature inside the cavity 13 exceeds the melting temperature of the 26 conduit.

Further shown in FIG. 30 is a projecting portion 37 of the suppression chamber formed by the junction box 12 itself. This projecting portion 37 in FIG. 30 is sized to project into or through the windows 22 in the cover plate which is shown covered by a hood 43. Should the projecting portion encounter a temperature high enough to melt, fire retardant from the suppression chamber, formed within the junction box 12 walls and communicating to the projecting portion 37, will be directed downward by the hood 43.

Figure 31:
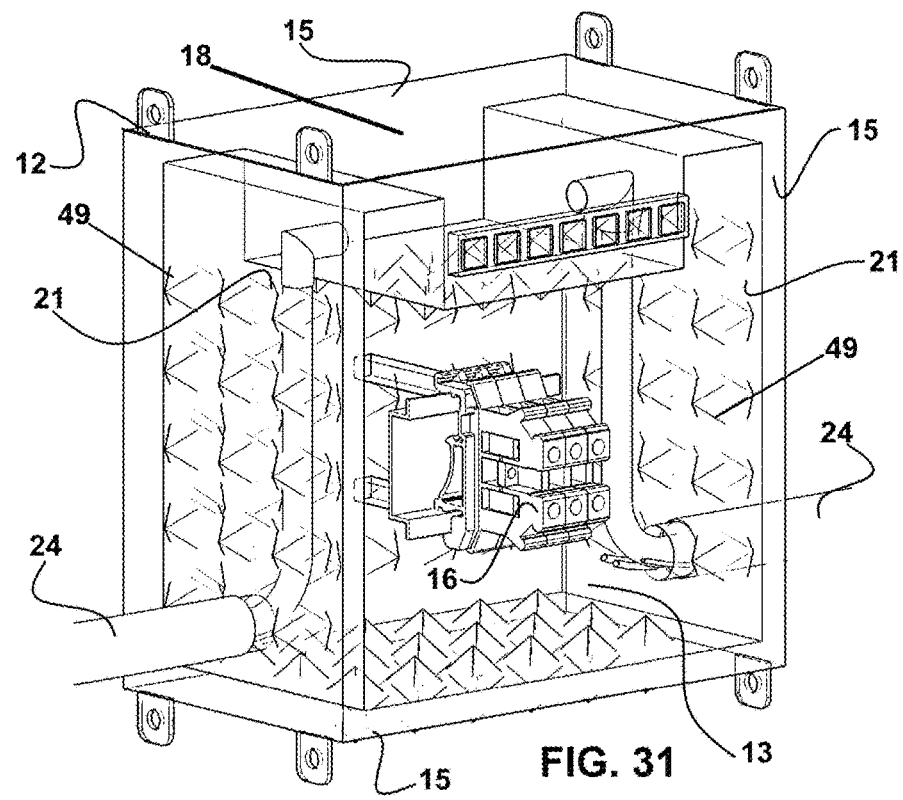
FIG. 31 depicts a junction box of the system herein similar in function to that of FIG. 30 where hollow sidewalls, surrounding the interior cavity which is adapted for the appropriate electric connection and fluid conduits communicate fluid through the passages in the hollow sidewalls.

In FIG. 31 is shown a junction box 12 of the system herein similar in operation to that of FIG. 30, where internal passages 21 at least one and preferably a plurality of the sidewalls 15 surrounding the interior cavity 13 of the junction box 12, are in operative communication with the axial passage 25 of the operatively engaged fluid conduit 26. In this fashion, fire retardant from the axial passage 25 communicates under pressure into one or more connected passages 25 formed within the sidewalls 15 surrounding the interior cavity 13 forming the suppression chamber 18 within the walls of the junction box 12 which surround the interior cavity 13 and any electric connection therein. As in FIG. 30 the suppressant chamber 18, is thus at least partly within the walls of the junction box 12 itself which are adapted to melt at the noted temperature levels herein.

Additionally shown in FIG. 31 are the series of pointed projections 49 formed into the surfaces of the sidewall 15. Should resistive heat or fire develop within or adjacent the junction box 12 sufficient to melt the sidewall 15, the pointed projections 49 will cause a directional flow of fire suppressant gas or fluid therethrough as they individually melt. These projections 49 can be positioned within the interior cavity 13 and/or on the exterior surfaces of the junction box 12 whereby fire retardant can be projected to areas adjacent the junction box 12. These triangular projections 49 allow for the charged suppression space to be closer to connection points or energized components as so desired.

Figure 32:
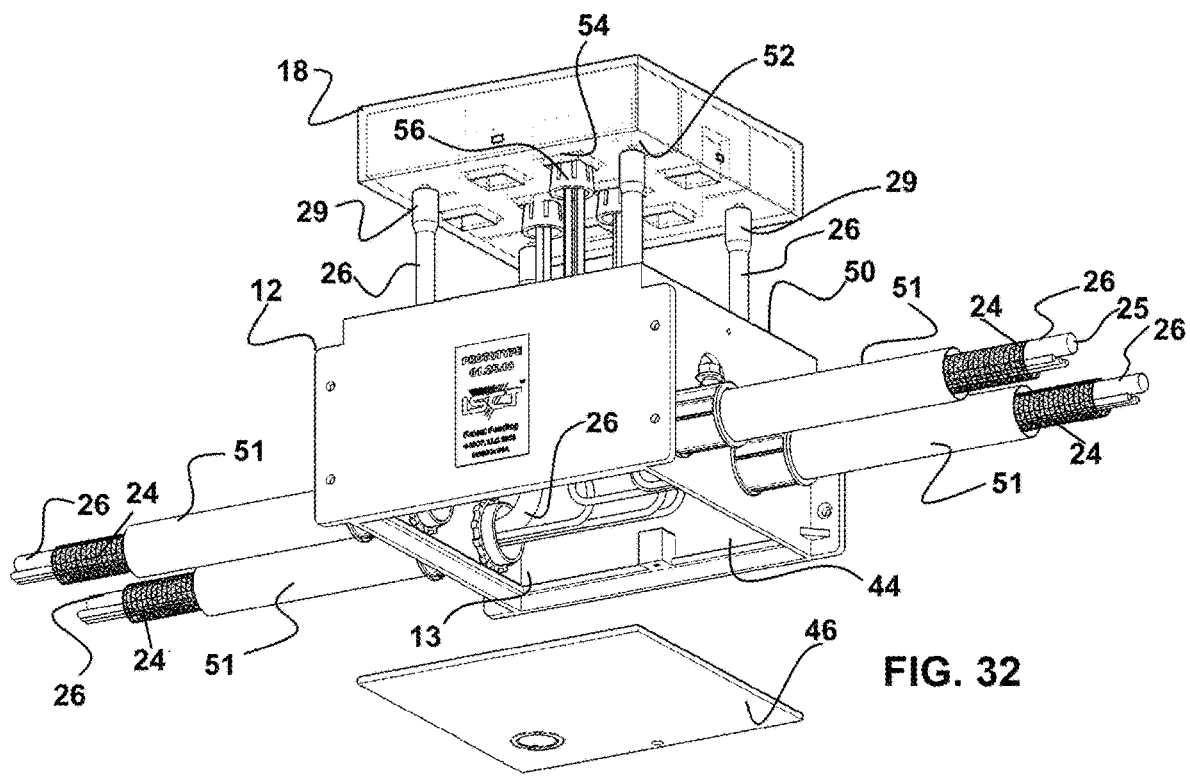
FIG. 32 shows a mode of a junction box of the system herein wherein the internal cavity of the junction box is accessible through a first side opening by removal of a conventional cover and which has a fluid chamber engaged to the opposing side opening which is adapted with connectors for fluid flow therethrough.

In FIG. 32 is depicted a junction box 12 of the system herein wherein the internal cavity 13 of the junction box 12 is accessible through a first side opening 44 by removal of a conventional cover plate 46. Covering the second side opening 50 opposite the first side opening 44 is a suppression chamber 18 adapted to engage with the second side opening 50 and enclose the electric connections within a closed internal cavity 13.

As depicted, a side surface 52 facing the internal cavity 13, has fluid connections 29 adapted to engage the fluid conduits 26 in the circuit to communicate fire retardant through the chamber 18. Also shown, formed into the side surface 52, are recesses 54 adapted to hold electrical connections between two wires 28 such as wire nuts 56 secured over time. Further depicted are metal conduits 51 showing that the system herein can route the cable surrounded by the sheath 24 through metal conduits 51 in a commercial setting requiring such. Additionally depicted is a polymeric diaphragm 53 which fills an aperture in the cover plate 46. This diaphragm 53 may be formed of a polymeric or other material adapted to melt at the appropriate temperature noted herein, to allow disbursement of fire retardant through the opening. The diaphragm also can be configured to have a burst pressure less that the enclosure to protect the enclosure structural integrity should over pressurization of the circuit occur thereby preventing the enclosure from structural failure from suppressant over-pressurization release.

Figure 33:
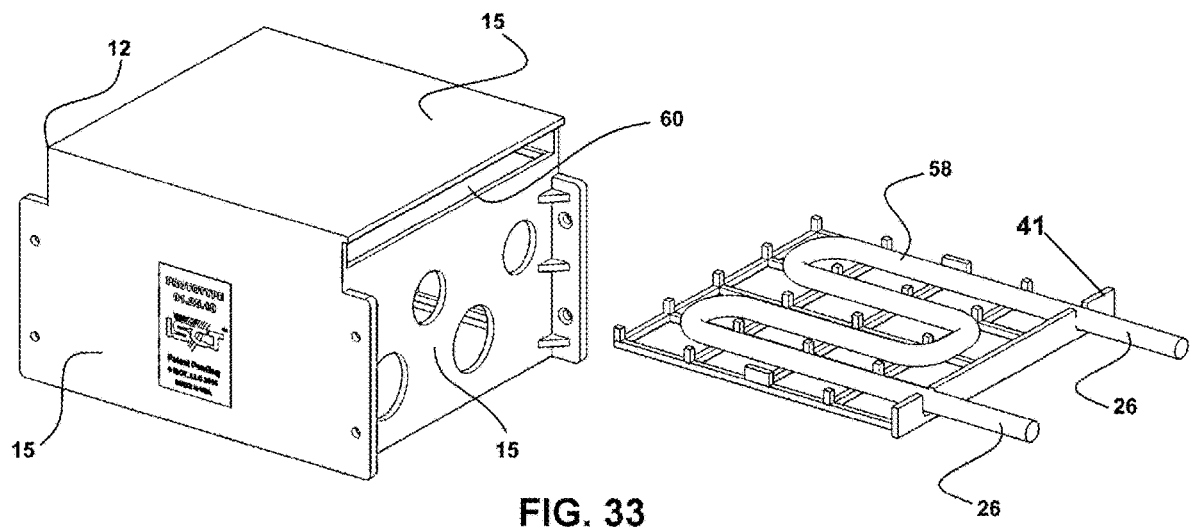
FIG. 33 depicts a junction box configured with one or a plurality of openings for passage of wires therethrough operatively into and out of the internal cavity and showing an insertable circuitous fluid tube holder for the tube which has connectors on both ends for operative connection to the fluid conduit.
Figure 34:
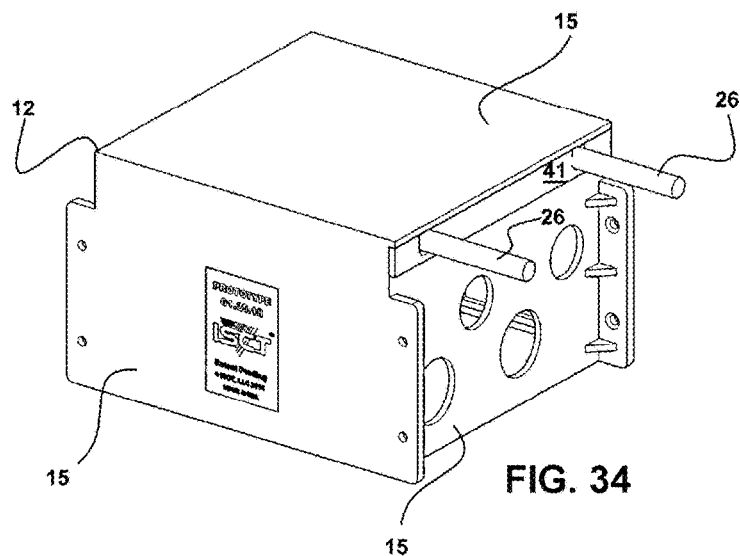
FIG. 34 shows the device as in FIG. 33, assembled with the fluid tube holder and tube engaged thereon operatively positioned within an internal cavity of the junction box.

In FIG. 33, is depicted a junction box 12 in a conventional fashion having sidewalls 15 which surround the internal cavity 13 and where punch-out portions of the sidewalls 15 are shown providing one or a plurality of openings for passage of wires into and out of the internal cavity 13. Additionally depicted is an insertable track 41 routing winds of a fluid tube 58 which may be a continuation of, or be engaged at both ends to, the fluid conduit 26 to communicate fire retardant into and through the length of the fluid tube 58. The fluid tube 58 may be pre-positioned or slid into a removable engagement with the junction box 12 and internal cavity through, an elongated slot 60 in one sidewall. Of course the track 41 may also engage a portion of the fluid conduit 26 from the cable 11 which would be engaged thereon in the circuitous route. The assembled mode of the junction box 12 of FIG. 33 is shown in FIG. 34 wherein the track 41 has been operatively engaged within the slot 60.

Figure 34A:
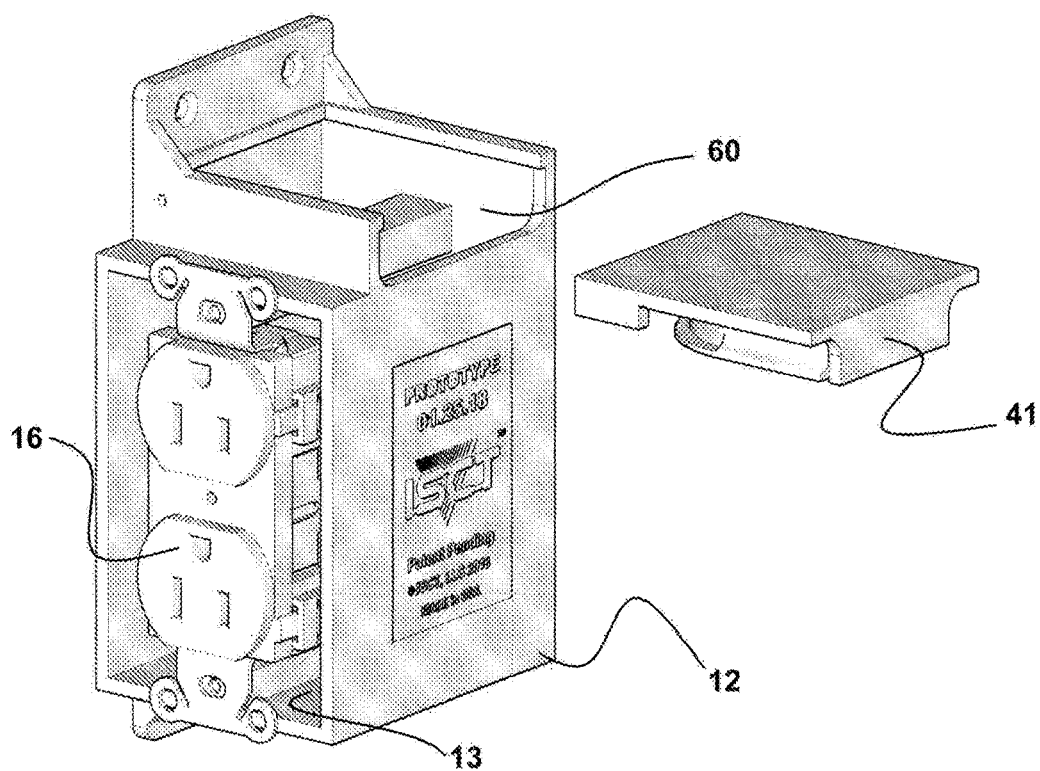
FIG. 34A depicts a junction box configured with one or a plurality of openings for passage of wires therethrough similar to FIG. 33, and showing an insertable circuitous fluid tube holder engageable to form a circuitous path for the tube through the junction box wherein it forms the reservoir.

Shown in FIG. 34A is a junction box 12 configured with one or a plurality of openings for passage of wires into the cavity 13 and through the junction box 12 similar to FIG. 33. Also shown is the slot 60 configured for insertion of the track 41 to hold a fluid tube in a circuitous path thereby forming the suppression chamber from windings of the fluid conduit 26 in a similar fashion to that of FIG. 33. Such might work well in retrofitting an older electrical system.

Figure 34B:
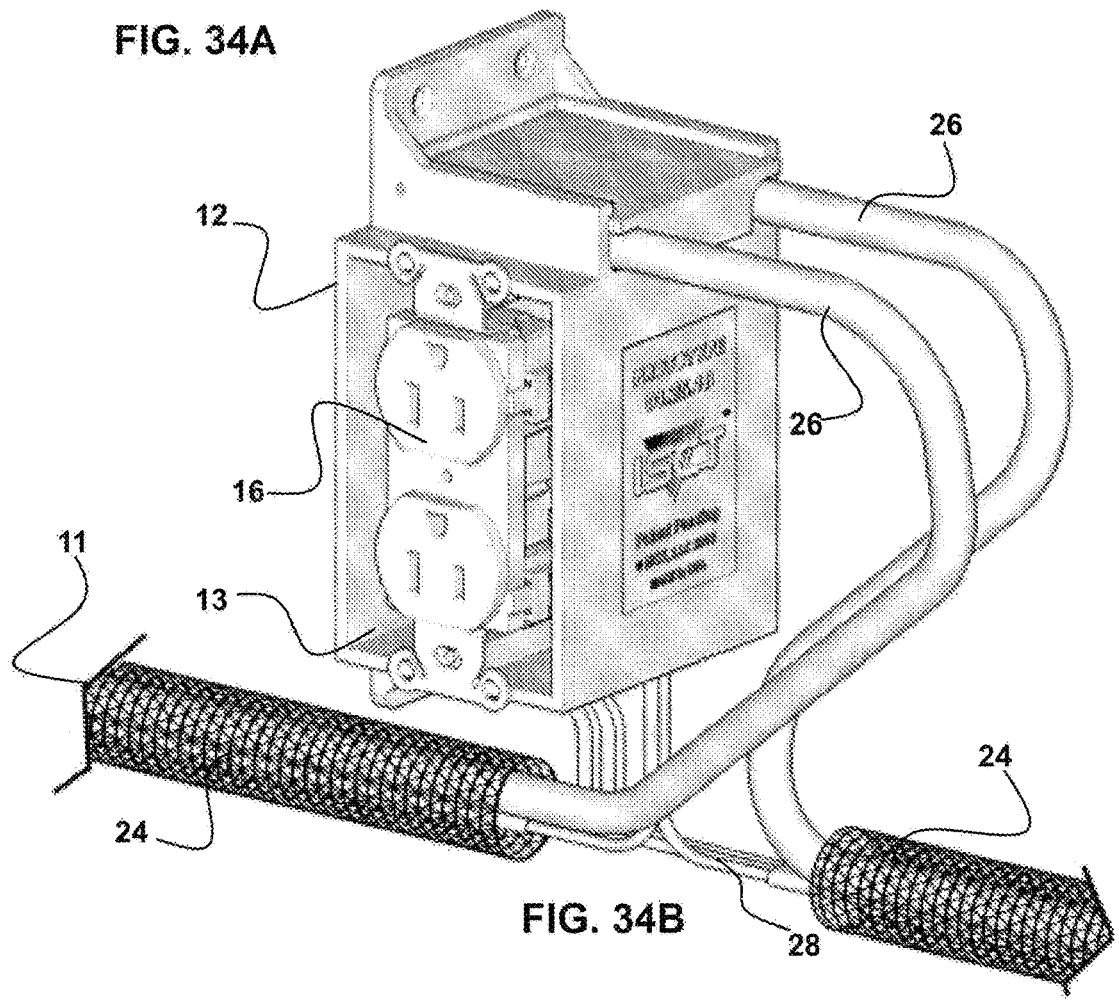
FIG. 34B shows the device as in FIG. 34A assembled with the fluid tube holder and tube wound thereon, operatively positioned within an internal cavity of the junction box.

The engagement of the track 41 within the slot 60 is shown in FIG. 34B. As depicted, the suppression chamber is formed by a winding of fluid conduit 26 on the track 41 which has been inserted operatively into the slot 60.

Figure 35:
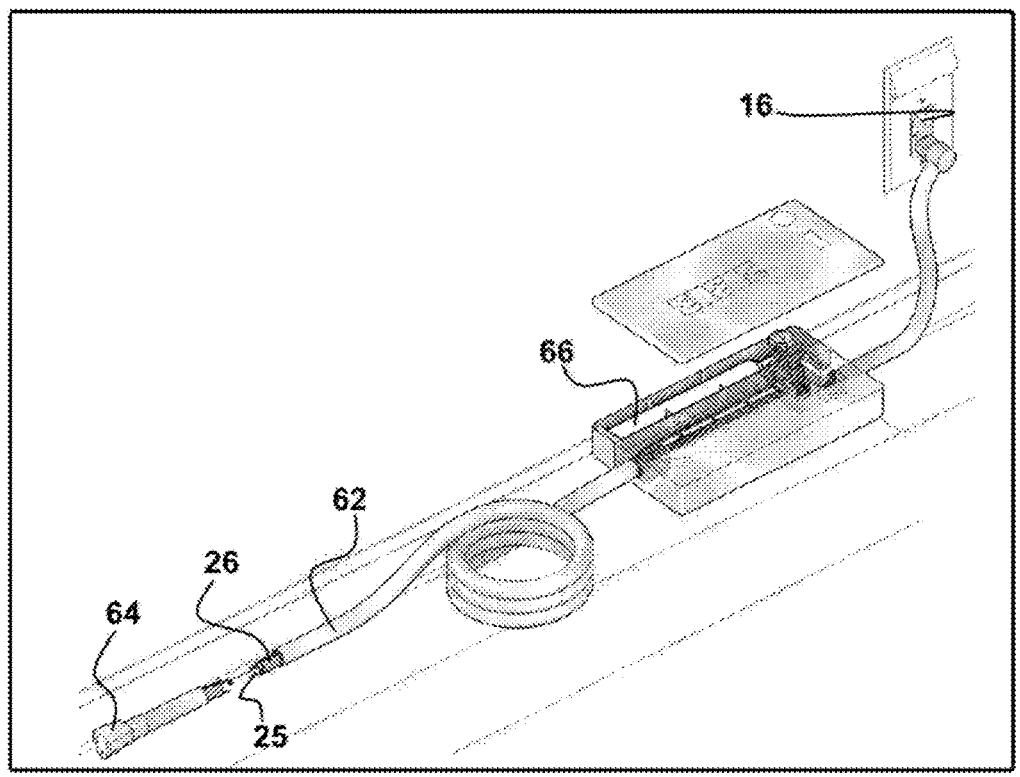
FIG. 35 depicts an extension cord configured with a fluid conduit for fire retardant of the system herein wherein retardant for the fluid conduit can be provided by an onboard pressurized supply or by a plug and receptacle adapted to sealably engage and communicate the retardant fluid from the fluid conduit communicating to the junction box.
Figure 36:
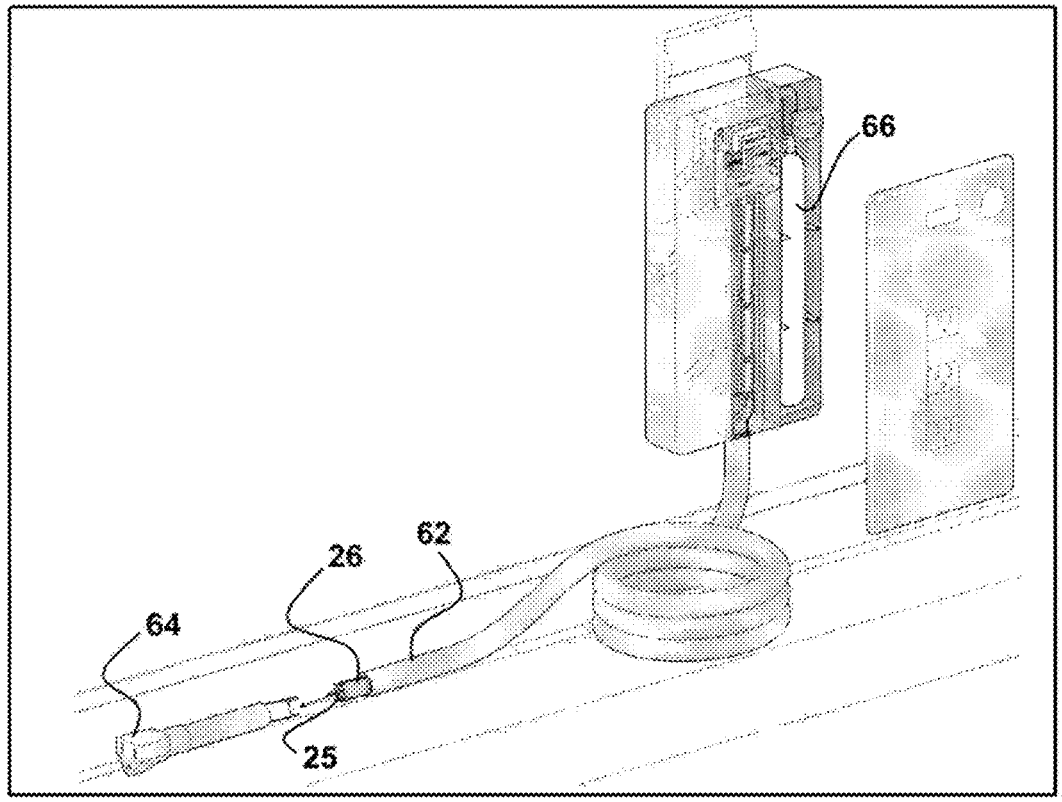
FIG. 36 depicts the extension cord similar to that of FIG. 35 wherein the cord housing engages with the wall socket.

Shown in FIGS. 35 and 36 depict a mode of the system herein which is a closed system. As shown, the cable herein defines an extension cord 62 adapted for connection to a first or wall socket 16 which is operatively engaged in the cavity 13 of a remotely positionable housing or junction box 12. This mode of the system herein is self contained and has a fluid conduit 26 communicating therethrough between a second socket 16 shown as plug receptacle 64 and an internally housed reservoir 66 of pressurized fire retardant within the housing. In this mode of the system, should the extension cord 62 overheat, the resulting communication of fire retardant to the overheating point on the extension cord 62 will extinguish any flame. While not shown, the apertures 32 can be formed in the flexible sheath of the cable forming the extension cord 62.

Figure 37:
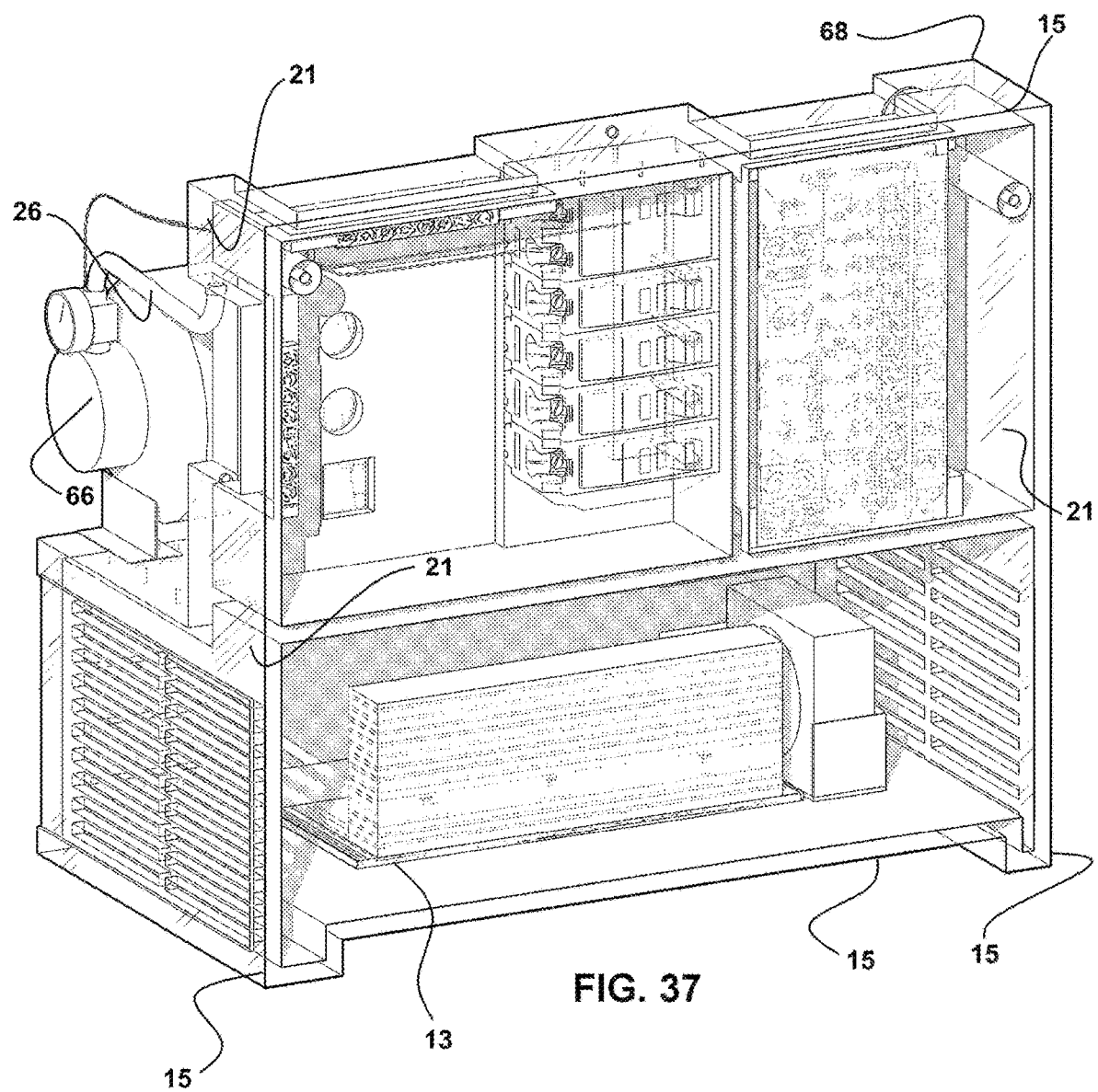
FIG. 37 shows a component of the system herein operating in a similar fashion to that of FIGS. 30-31 showing a housing formed to surround an electric inverter wherein the housing sidewall surrounding the internal cavities and components therein are hollow and form passages for fluid retardant therein.

A similar self contained mode of the system herein is shown in FIG. 37. As depicted a housing 68 is configured for positioning of larger electric components within the interior cavities 13 of the formed housing 68 which is defined by the surrounding sidewalls 15. Shown in a transparent rendition the sidewalls 15 form an internal cavity having a reservoir 66 of fire retardant therein. The reservoir 66 connects through the fluid conduit 26 to the extension cord 62 to a remote plug receptacle 64. This mode of the system would work well where the larger electronic component is for example used in a recreational vehicle or boat or other portable configuration, to guard against fire from resistive heating or sparking in wiring or overheating of the electronic component located proximate to the portable housing 68.

Figure 38:
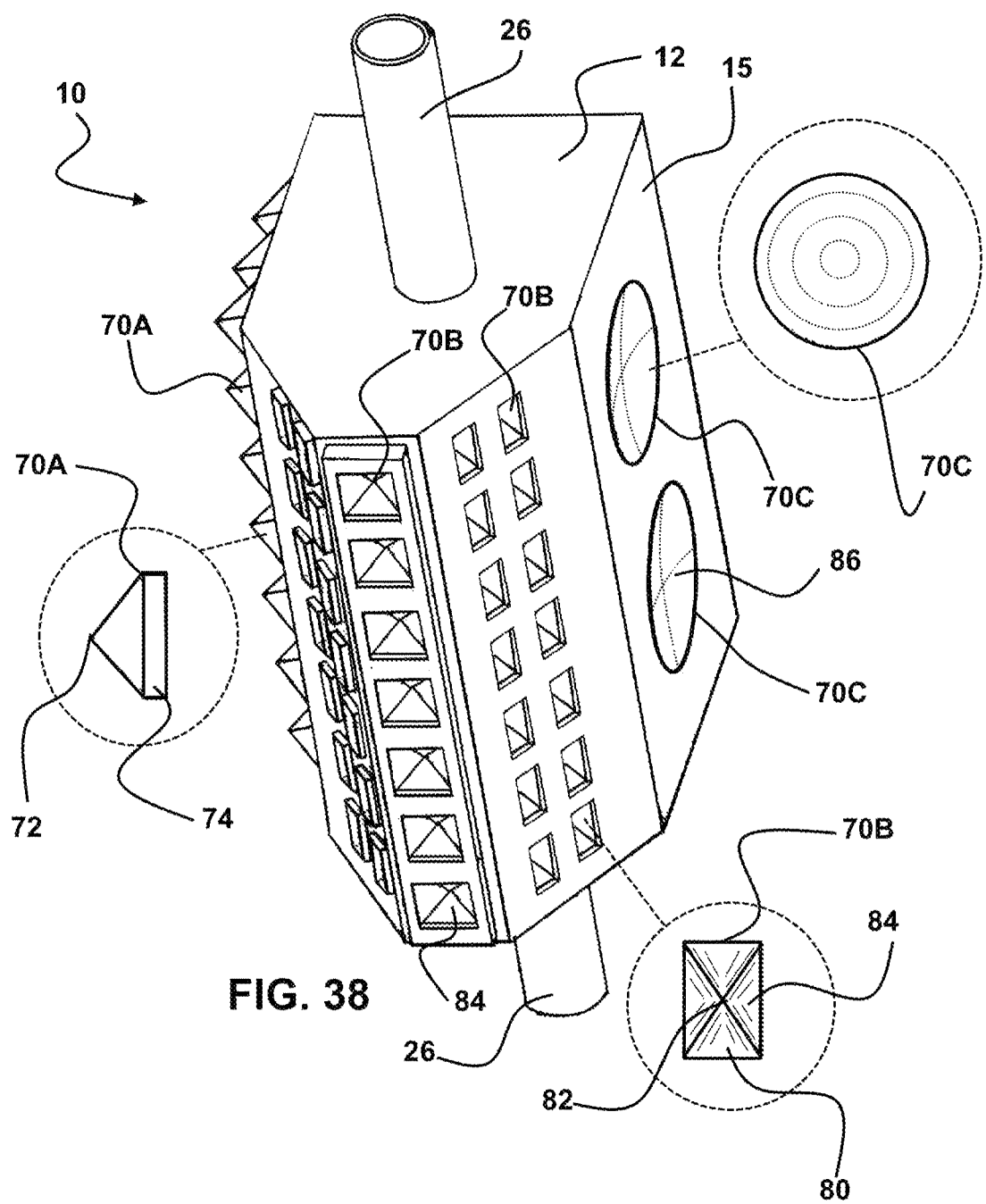
FIG. 38 depicts a junction box for the system herein, which has fluid nozzles formed to emit a directional flow of fire suppressant fluid therefrom.

Shown in FIG. 38, FIG. 38 depicts a junction box 12 which is operatively connected to a fluid conduit 26 which supplies suppressant fluid to passages 21, such as in FIG. 30A, to the junction box 12. Shown, formed into the sidewall 15 of the junction box 12, are differing configurations of nozzles 70. These nozzles 70 are positioned on one or a plurality of the sidewalls 15 of the junction box 12 and can be configured for a targeted stream of suppressant in a directional flow 78 (FIG. 39) therefrom.

As shown, one projecting nozzle 70A has a narrowing configuration wherein the distal end 72 thereof, forms to a point which is narrower than a base 74 of the projecting nozzle 70A. The nozzle sidewall or sidewalls 84 thus angle from the base 74 toward the distal end 72. The distal end 72 can be formed to melt or burst when heated and supplied with pressurized fluid, and to disburse suppressant fluid therefrom in a narrow spread thereof or a singular stream thereof. Where used herein, nozzle sidewall 84 is intended to mean a single nozzle sidewall 84 which, for example, may have a tube-like or a conical shape, or may have intersecting angled portions forming the sidewall 84 which define the shape and size of the nozzle 70.

Figure 39:
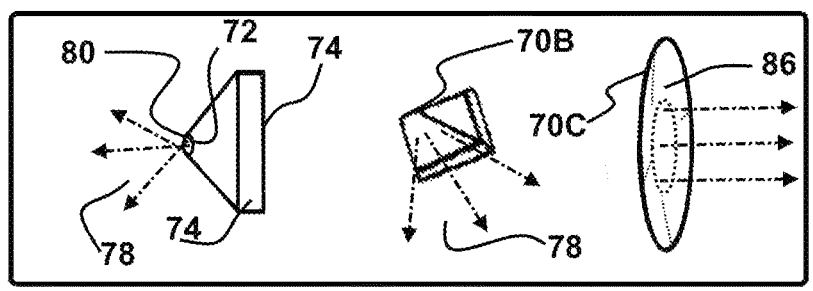
FIG. 39 shows exemplars of some of the nozzles which can be formed to emit a narrow, pointed, or wide flood of suppressant fluid therefrom.

A fluid opening 76, as shown in FIG. 39, would thus be formed at the distal end 72 of the projecting nozzle 70A, by a melting of a plug positioned in the fluid opening 76, or a melting of the distal end 72 of the projecting nozzle 70A. Fluid would disburse during a fire, or overheating of the area surrounding the junction box 12, and the directional flow 78 of suppressant fluid as in FIG. 39, would flow therefrom.

By directional flow 78, as used herein, is meant a fluid flow focused by the configuration of the nozzle 70 to be emitted as a straight line, a fanned spread either in a single plane or radial pattern emission, or any other pattern of fluid emission which can be formed by nozzle 70 sidewalls 84. Further, while nozzles 70 are shown as projecting nozzles 70A, and recessed nozzles 70B, or dome shaped nozzles 70C, herein, such is for convenience and any nozzle 70 which can be positioned on or in a sidewall 15 of a junction box 12, to emit a focused or shaped fluid stream therefrom, is considered within the scope of this invention.

Also depicted in FIG. 38 nozzles 70 formed as recessed nozzles 70B which have a nozzle opening 80 which is wider than a nozzle inlet 82 which recessed into the sidewall 15. In this mode, the inlet 82 end of the recessed nozzle 70B is formed to melt or burst first when heated and allow fluid suppressant to flow from the inlet 82 end, to the wider nozzle opening 80. The fluid direction is focused to emit in a fanned or radial pattern or highly disbursed fluid by angled nozzle sidewalls 84. Changing the number and angle of the angled sidewalls 84 allows for a changing of the pattern of fluid in the directional flow 78 of suppressant.

Additionally shown in FIG. 38 are dome shaped or domed nozzles 70C. The domed nozzles 70C can be formed as depressions into the sidewall 15 or a projecting domes from the sidewall 15. The dome wall 86 defining the domed nozzles 70C can be formed of a material which melts before the material forming the junction box 12 and sidewall 15 of the same material in a thinner layer such that it will melt before the junction box 12 and sidewall 13. This mode of nozzle 70 can be employed to project a high volume of suppressant from the junction box 12 depending on the diameter or area forming the dome wall 86 of the domed nozzles 70C.

As noted, shown in FIG. 39 are exemplars of some of the nozzles 70 which can be formed to emit a narrow, pointed, or wide flood of suppressant fluid therefrom in the desired directional flow 78. As also noted, the depictions in FIGS. 38-40 of the nozzles 70 should be in no way considered limiting.

Figure 40:
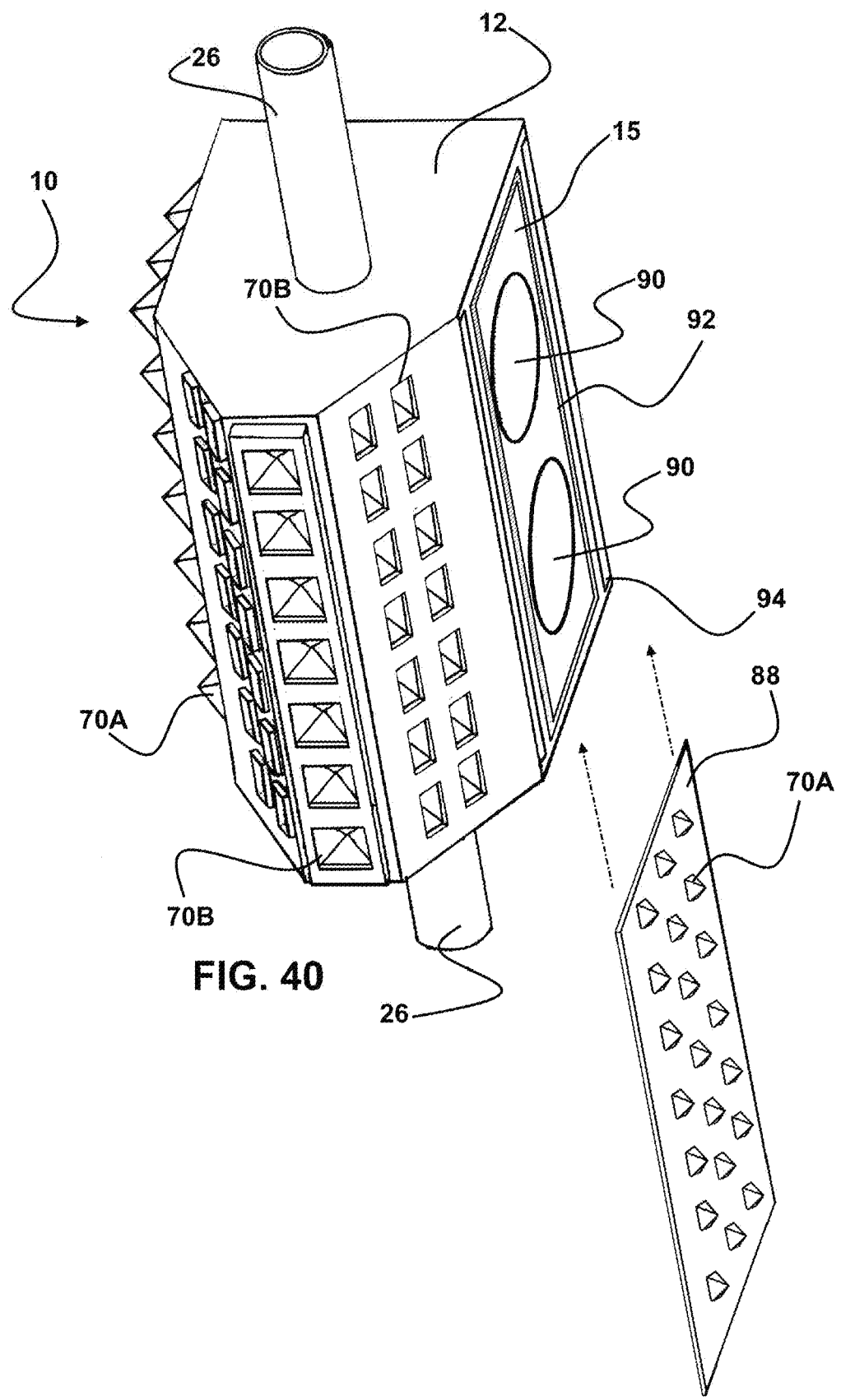
FIG. 40 shows a mode of the device herein, wherein the nozzles are formed in an engageable nozzle panel in a fluid-sealed engagement with the junction box where the nozzle panels can be from a kit of such including a variety of fluid directing nozzles formed in such nozzle panels.

As shown in FIG. 40, the nozzles 70 in all modes thereof, can be formed in nozzle panels 88. While depicted with projecting nozzles 70A, the nozzle panel 88 can be formed with any of the nozzle configurations herein, or which are shaped to emit the desired shape and volume of fluid in the directional flow 78 of choice. While shown as a single nozzle panel 88, kits including a plurality of such nozzle panels 88 can be included in the system herein, wherein the user can choose the nozzle panel 88 having the desired configuration of nozzle 70 to emit a desired directional flow 78 of suppressant fluid therefrom in the desired pattern and volume determined by the shape or configuration of the nozzle 70.

As shown in FIG. 40, the chosen nozzle panel 88 from the kit or plurality thereof, which has the desired nozzles 70 thereon, can be placed in a sealed engagement with the sidewall 15 of the junction box 12 which will have sidewall openings 90 in fluid communication with the suppressant communicated to the junction box 12 by the fluid conduit 26.

A panel seal 92 forms a sealed engagement of the junction box 12 sidewall 15 with the nozzle panel 88 chosen for such engagement. A panel connector is employed to hold the nozzle panel 88 in a sealed connection to the junction box 12. Such may be any panel connector configured to hold the nozzle panel 88 in the sealed connection to the sidewall 15 of the junction box 12, such as slots 94 into which opposing sides of the nozzle panel 88 engage. The depicted slots 94 should be considered in no way limiting as to the panel connector employed to hold a nozzle panel 88 chosen to the sealed engagement with the junction box 12. Any panel connector, such as snaps, pins, adhesive, or mating connectors positioned on the junction box 12 and on the nozzle panel 88, or other mating connectors as would occur to those skilled in the art, may be used.

As noted, any of the different configurations and components can be employed with any other configuration or component shown and described herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

The invention claimed is:

1. A cable assembly, comprising:
   a cable with a sheath and at least one wire arranged therein, wherein the sheath is spaced a distance apart from the wire, thereby forming an interstitial space between the at least one wire and the sheath;
   at least one fluid conduit for conveying of a coolant; and
   a connector comprising at least one contact member and a chamber, wherein the at least one contact member is interconnected to the at least one wire, the chamber comprising:
   a first port which is interconnected to the interstitial space between the at least one wire and the sheath; and
   a second port which is interconnected to the fluid conduit.

2. The cable assembly according to claim 1, wherein the at least one fluid conduit for conveying of the coolant is arranged inside of the sheath.

3. The cable assembly according to claim 1, wherein the at least one fluid conduit for conveying the coolant is arranged outside of the sheath.

4. The cable assembly according to claim 1, wherein at least one fluid conduit to convey coolant is arranged in a center region of the sheath and at least two wires are arranged radially around the at least one fluid conduit between the at least one fluid conduit and the sheath.

5. The cable assembly according to claim 1, wherein the at least one wire has an insulation.

6. The cable assembly according to claim 1, wherein the at least one contact member comprises a channel for cooling of the at least one contact member, wherein the channel is interconnected to the interstitial space and/or the sheath to convey coolant.

7. The cable assembly according to claim 1, wherein the cable assembly comprises an adapter charger for the interconnection of the at least one wire to an outer power source.

8. The cable assembly according to claim 1, wherein each wire of the at least one wire is separately enclosed by insulation.

9. The cable assembly according to claim 1, wherein the fluid conduit is disposed radially outward of one or more of the at least one wires.

10. The cable assembly according to claim 1, wherein the at least one wire comprises a circumferentially arranged bundle of wires.

11. The cable assembly according to claim 10, wherein each of the wires in the circumferentially arranged bundle of wires is axially parallel.

12. The cable assembly according to claim 1, wherein the at least one wire comprises a plurality of wires, and wherein all of the wires in the bundle of wires are axially parallel.

13. The cable assembly according to claim 1, wherein the first port is disposed external of the sheath.

14. The cable assembly according to claim 1, wherein the connector further comprises a connector housing, and wherein the connector housing has at least one impact absorbing means arranged at an outer face of the connector housing.

15. The cable assembly according to claim 1, wherein the connector further comprises a connector housing, and wherein the connector housing has a connector face configured to absorb impact.

16. The cable assembly according to claim 1, wherein the connector is a plug.

17. A cable assembly, comprising:
a cable with a sheath and a first wire and a second wire arranged therein, wherein the sheath is spaced a distance apart from the first wire and second wire, thereby forming an axial passageway between the sheath and the first wire and the second wire;
a first fluid conduit and a second fluid conduit for conveying of a coolant; and
a connector comprising at least one contact member and a chamber, wherein the at least one contact member is interconnected to the at least one wire and a chamber, the chamber comprising:
a first port which is interconnected to the axial passageway between the sheath and the first wire and the second wire; and
a second port which is interconnected to the first fluid conduit and the second fluid conduit.

18. A cable assembly, comprising:
a cable with a cable hose and at least one conductor arranged therein, wherein the cable hose is spaced a distance apart from the conductor forming an interstitial space between the at least one conductor and the cable hose; and
at least one tube for conveying of a cooling fluid;
a connector comprising at least one contact member, a connector housing, and a chamber,
wherein the at least one contact member is interconnected to the at least one conductor,
wherein the connector housing has at least one impact absorbing means arranged at an outer face of the connector housing, and
wherein the chamber comprises:
a first port which is interconnected to the interstitial space between the at least one conductor and the cable hose, and
a second port which is interconnected to the tube.

* * * * *